US006023403A

United States Patent [19]

McGuire et al.

[11] Patent Number: 6,023,403

[45] **Date of Patent: *Feb. 8, 2000**

[54] SURFACE MOUNTABLE ELECTRICAL DEVICE COMPRISING A PTC AND FUSIBLE ELEMENT

[75] Inventors: Katherine M. McGuire, Downers Grove; Honorio Luciano, Elk Grove Village, both of Ill.

[73] Assignee: Littlefuse, Inc., Des Plaines, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/978,657

[22] Filed: Nov. 26, 1997

Related U.S. Application Data

[63] Continuation-in-part of application No. 08/642,597, May 3, 1996, Pat. No. 5,900,800, and a continuation-in-part of application No. 08/642,655, May 3, 1996, Pat. No. 5,699,607, and a continuation-in-part of application No. 08/884,711, Jun. 30, 1997, Pat. No. 5,884,391, and a continuation-in-part of application No. 08/885,084, Jun. 30, 1997.

[51] Int. Cl.[7] .................................................. H02H 5/04

[52] U.S. Cl. .................................... 361/106; 338/22 R

[58] Field of Search ................................ 361/103, 104, 361/106, 111, 58; 338/22 R; 337/142

[56] References Cited

U.S. PATENT DOCUMENTS

| | | |
|---|---|---|
| 2,978,665 | 4/1961 | Vernet et al. . |
| 3,241,026 | 3/1966 | Andrich . |
| 3,243,753 | 3/1966 | Kohler . |
| 3,351,882 | 11/1967 | Kohler et al. . |
| 3,591,526 | 7/1971 | Kawashima et al. . |
| 3,823,217 | 7/1974 | Kampe . |
| 3,828,332 | 8/1974 | Rekai . |
| 3,858,144 | 12/1974 | Bedard et al. . |
| 4,124,747 | 11/1978 | Murer et al. . |
| 4,169,816 | 10/1979 | Tsien . |
| 4,177,376 | 12/1979 | Horsma et al. . |

(List continued on next page.)

FOREIGN PATENT DOCUMENTS

| | | |
|---|---|---|
| 1254323 | 5/1989 | Canada . |
| 0 169 059 A2 | 1/1986 | European Pat. Off. . |
| 0 460 790 A1 | 12/1991 | European Pat. Off. . |
| 0 588 136 A2 | 3/1994 | European Pat. Off. . |
| 0 731 475 A2 | 9/1996 | European Pat. Off. . |
| 0 790 625 A2 | 8/1997 | European Pat. Off. . |
| 0 827 160 A1 | 3/1998 | European Pat. Off. . |

(List continued on next page.)

OTHER PUBLICATIONS

Yoshio Sorimachi, Ichiro Tsubata and Noboru Nishizawa, The Transactions of the Institute of Electronics and Communications Engineers of Japan —Analysis of Static Self Heating Characteristics of PTC Thermistor Based on Carbon Black Graft Polymer, vol. J61–C, No. 12, pp. 767–774 (Dec. 25, 1978).

(List continued on next page.)

*Primary Examiner*—Michael J. Sherry
*Attorney, Agent, or Firm*—Wallenstein & Wagner, Ltd.

[57] ABSTRACT

The present invention is a device for protecting an electrical circuit. The device includes a resistive element having a first and a second surface. A first electrode is in electrical contact with the first surface of the resistive element and a second electrode is in electrical contact with the second surface of the resistive element. A first end termination electrically connects the circuit and the first electrode. A second end termination electrically connects the second electrode and the circuit. An electrically insulating layer is interposed between the first and second end terminations and is in contact with the first and second electrodes. The end terminations allow for an electrical connection to be made to both electrodes from the same side of the electrical device.

30 Claims, 13 Drawing Sheets

U.S. PATENT DOCUMENTS

| | | | |
|---|---|---|---|
| 4,177,446 | 12/1979 | Diaz . | |
| 4,188,276 | 2/1980 | Lyons et al. . | |
| 4,223,209 | 9/1980 | Diaz . | |
| 4,237,441 | 12/1980 | van Konynenburg et al. . | |
| 4,238,812 | 12/1980 | Middleman et al. . | |
| 4,259,657 | 3/1981 | Ishikawa et al. . | |
| 4,272,471 | 6/1981 | Walker . | |
| 4,304,987 | 12/1981 | van Konynenburg . | |
| 4,318,220 | 3/1982 | Diaz . | |
| 4,327,351 | 4/1982 | Walker . | |
| 4,329,726 | 5/1982 | Middleman et al. . | |
| 4,330,703 | 5/1982 | Horsma et al. . | |
| 4,330,704 | 5/1982 | Jensen . | |
| 4,367,168 | 1/1983 | Kelly . | |
| 4,383,942 | 5/1983 | Davenport . | |
| 4,388,607 | 6/1983 | Toy et al. . | |
| 4,413,301 | 11/1983 | Middleman et al. . | |
| 4,426,546 | 1/1984 | Hotta et al. . | |
| 4,426,633 | 1/1984 | Taylor . | |
| 4,445,026 | 4/1984 | Walker . | |
| 4,475,138 | 10/1984 | Middleman et al. . | |
| 4,534,889 | 8/1985 | van Konynenburg et al. . | |
| 4,548,740 | 10/1985 | von Tomkewitsch et al. . | |
| 4,560,498 | 12/1985 | Horsma et al. . | |
| 4,617,609 | 10/1986 | Utner et al. . | |
| 4,685,025 | 8/1987 | Carlomagno . | |
| 4,689,475 | 8/1987 | Kleiner et al. . | |
| 4,724,417 | 2/1988 | Au et al. . | |
| 4,732,701 | 3/1988 | Nishii et al. . | |
| 4,749,623 | 6/1988 | Endo et al. . | |
| 4,774,024 | 9/1988 | Deep et al. . | |
| 4,775,778 | 10/1988 | van Konynenburg et al. . | |
| 4,786,888 | 11/1988 | Yoneda et al. | 338/22 R |
| 4,800,253 | 1/1989 | Kleiner et al. . | |
| 4,801,785 | 1/1989 | Chan et al. . | |
| 4,857,880 | 8/1989 | Au et al. . | |
| 4,876,439 | 10/1989 | Negahori . | |
| 4,878,038 | 10/1989 | Tsai . | |
| 4,880,577 | 11/1989 | Okita et al. . | |
| 4,882,466 | 11/1989 | Friel . | |
| 4,884,163 | 11/1989 | Deep et al. . | |
| 4,907,340 | 3/1990 | Fang et al. . | |
| 4,910,389 | 3/1990 | Sherman et al. . | |
| 4,924,074 | 5/1990 | Fang et al. . | |
| 4,951,382 | 8/1990 | Jacobs et al. . | |
| 4,955,267 | 9/1990 | Jacobs et al. . | |
| 4,959,632 | 9/1990 | Uchida . | |
| 4,966,729 | 10/1990 | Carmona et al. . | |
| 4,967,176 | 10/1990 | Horsma et al. . | |
| 4,971,726 | 11/1990 | Maeno et al. . | |
| 4,973,934 | 11/1990 | Saito et al. . | |
| 4,980,541 | 12/1990 | Shafef et al. . | |
| 4,983,944 | 1/1991 | Uchida et al. . | |
| 4,992,771 | 2/1991 | Caporali et al. | 338/22 R |
| 5,068,061 | 11/1991 | Knobel et al. . | |
| 5,089,801 | 2/1992 | Chan et al. . | |
| 5,106,538 | 4/1992 | Barma et al. . | |
| 5,106,540 | 4/1992 | Barma et al. . | |
| 5,136,365 | 8/1992 | Pennisi et al. . | |
| 5,140,297 | 8/1992 | Jacobs et al. . | |
| 5,142,263 | 8/1992 | Childers et al. . | |
| 5,143,649 | 9/1992 | Blackledge et al. . | |
| 5,171,774 | 12/1992 | Ueno et al. . | |
| 5,174,924 | 12/1992 | Yamada et al. . | |
| 5,189,092 | 2/1993 | Koslow . | |
| 5,190,697 | 3/1993 | Ohkita et al. . | |
| 5,195,013 | 3/1993 | Jacobs et al. . | |
| 5,212,466 | 5/1993 | Yamada et al. . | |
| 5,214,091 | 5/1993 | Tanaka et al. . | |
| 5,227,946 | 7/1993 | Jacobs et al. . | |
| 5,231,371 | 7/1993 | Kobayashi . | |
| 5,241,741 | 9/1993 | Sugaya . | |
| 5,247,276 | 9/1993 | Yamazaki . | |
| 5,247,277 | 9/1993 | Fang et al. . | |
| 5,250,226 | 10/1993 | Oswal et al. . | |
| 5,250,228 | 10/1993 | Baigrie et al. . | |
| 5,257,003 | 10/1993 | Mahoney . | |
| 5,268,665 | 12/1993 | Iwao . | |
| 5,280,263 | 1/1994 | Sugaya . | |
| 5,281,845 | 1/1994 | Wang et al. . | |
| 5,289,155 | 2/1994 | Okumura et al. . | |
| 5,303,115 | 4/1994 | Nayar et al. | 361/106 |
| 5,313,184 | 5/1994 | Greuter et al. . | |
| 5,337,038 | 8/1994 | Taniguchi et al. . | |
| 5,351,026 | 9/1994 | Kanbara et al. . | |
| 5,351,390 | 10/1994 | Yamada et al. . | |
| 5,358,793 | 10/1994 | Hanada et al. . | |
| 5,374,379 | 12/1994 | Tsubokawa et al. . | |
| 5,382,384 | 1/1995 | Baigrie et al. . | |
| 5,382,938 | 1/1995 | Hansson et al. . | |
| 5,399,295 | 3/1995 | Gamble et al. . | |
| 5,412,865 | 5/1995 | Takaoka et al. . | |
| 5,488,348 | 1/1996 | Asida et al. . | |
| 5,493,266 | 2/1996 | Sasaki et al. . | |
| 5,500,996 | 3/1996 | Fritsch et al. . | |
| 5,543,705 | 8/1996 | Uezono et al. . | |
| 5,554,679 | 9/1996 | Cheng . | |
| 5,610,436 | 3/1997 | Sponaugle et al. . | |
| 5,663,702 | 9/1997 | Shaw, Jr. et al. | 338/22 R |
| 5,747,147 | 5/1998 | Wartenberg et al. . | |
| 5,777,541 | 7/1998 | Vekeman . | |
| 5,801,612 | 9/1998 | Chandler et al . | |
| 5,817,423 | 10/1998 | Kajimaru et al. . | |
| 5,818,676 | 10/1998 | Gronowicz, Jr. . | |
| 5,831,510 | 11/1998 | Zhang et al. . | |
| 5,849,129 | 12/1998 | Hogge et al. . | |
| 5,852,397 | 12/1998 | Chan et al. . | |
| 5,864,281 | 1/1999 | Zhang et al. . | |
| 5,874,885 | 2/1999 | Chandler et al. . | |

FOREIGN PATENT DOCUMENTS

| | | |
|---|---|---|
| 0 901 133 A2 | 3/1999 | European Pat. Off. . |
| 50-33707 | 12/1972 | Japan . |
| 52-62680 | 5/1977 | Japan . |
| 53-104339 | 8/1978 | Japan . |
| 60-196901 | 10/1985 | Japan . |
| 5-109502 | 4/1993 | Japan . |
| 7-161503 | 6/1995 | Japan . |
| 541222 | 11/1941 | United Kingdom . |
| 604695 | 7/1948 | United Kingdom . |
| 1172718 | 12/1969 | United Kingdom . |
| 1449261 | 9/1976 | United Kingdom . |
| 1604735 | 12/1981 | United Kingdom . |
| WO 93/14511 | 7/1993 | WIPO . |
| WO 94/01876 | 1/1994 | WIPO . |
| WO 95/08176 | 3/1995 | WIPO . |
| WO 95/31816 | 11/1995 | WIPO . |
| WO 95/33276 | 12/1995 | WIPO . |
| WO 95/34084 | 12/1995 | WIPO . |
| WO 98112715 | 3/1998 | WIPO . |
| WO 98/29879 | 7/1998 | WIPO . |
| WO 98/34084 | 8/1998 | WIPO . |
| WO 99/03113 | 1/1999 | WIPO . |

OTHER PUBLICATIONS

Ichiro Tsubata and Yoshio Sorimachi, Faculty of Engineering, Niigata University—PTC Characteristics and Components on Carbon Black Graft Polymer, pp. 31–38 (with translation) (No date).

Yoshio Sorimachi and Ichiro Tsubata, The Transactions of the Institute of Electronics and Communication Engineers of Japan—Characteristics of PTC Thermistor Based on Carbon Black Graft Polymer, vol. J60–C, No. 2, pp. 90–97 (Feb. 25, 1977).

Yoshio Sorimachi and Ichiro Tsubata, Electronics Parts and Materials, Niigata University—The Analysis of Current Falling Characteristics on C.G. (Carbon Black Graft Polymer)—PTC Thermistor, Shingaku Gihou, vol. 9, pp. 23–27 ED–75–35, 75–62 (1975) (with Translation) (No Month).

B. Wartgotz and W.M. Alvino, Polymer Engineering and Science—Conductive Polyethylene Resins from Ethylene Copolymers and Conductive Carbon Black, pp. 63–70 (Jan. 1967).

Kazuyuki Ohe and Yoshihide Naito, Japanese Journal of Applied Physics—A New Resistor Having an Anomalously Large Positive Temperature Coefficient, vol. 10, No. 1, pp. 99–108 (Jan. 1971).

Ichiro Tsubata and Naomitsu Takashina, 10th Regional Conference on Carbon—Thermistor with Positive Temperature Coefficient Based on Graft Carbon, pp. 235–236 (1971) (No Month).

J. Meyer, Polymer Engineering and Science—Glass Transition Temperature as a Guide to Selection of Polymers Suitable for PTC Materials, vol. 13, No. 6, pp. 462–468 (Nov. 1973).

J. Meyer, Polymer Engineering and Science—Stability of Polymer Composites as Positive–Temperature–Coefficient Resistors, vol. 14, No. 10, pp. 706–716 (Oct. 1974).

Yoshio Sorimachi and Ichiro Tsubata, Shengakeekai Parts Material—Characteristics of PTC–Thermistor Based on Carbon Black Graft Polymer, vol. 9, Paper, No. UDC 621,316,825.2: [678,744,32–13:661,666.4 (1974) (No Month).

Carl Klason and Josef Kubat, Journal of Applied Polymer Science—Anomalous Bahavior of Electrical Conductivity and Thermal Noise in Carbon Black–Containing Polymers at $T_q$ and $T_m$ , vol. 19, pp. 831–845 (1975) (No Month).

M. Narkis, A. Ram and F. Flashner, Polymer Engineering and Science—Electrical Properties of Carbon Black Filled Polyethylene, vol. 18, No. 8 pp. 649–653 (Jun. 1978).

Andries Voet, Rubber Chemistry and Technology—Temperature Effect of Electrical Resistivity of Carbon Black Filled Polymers, vol. 54, pp. 42–50 (No date).

M. Narksi, A. Ram and Z. Stein, Journal of Applied Polymer Science—Effect of Crosslinking on Carbon Black/Polyetylene Switching Materials, vol. 25, pp. 1515–1518 (1980) (No Month).

Frank A. Doljack, IEEE Transactions on Components Hybrids and Manufacturing—Technology, PolySwitch PTC Devices–A New Low–Resistance Conductive Polymer–Based PTC Device for Overcurrent Protection, vol. CHMT, No. 4, pp. 372–378 (Dec. 1981).

Keizo Miyasaka, et al., Journal of Materials Science—Electrical Conductivity of Carbon–Polymer Composites as Function of Carbon Content, vol. 17, pp. 1610–1616 (1982) (No Month).

D.M. Bigg, Conductivity in Filled Thermoplastics—An Investigation of the Effect of Carbon Black Structure, Polymer Morphology, and Processing History on the Electrical Conductivity of Carbon–Black–Filled Thermoplastics, pp. 501–516 (No date).

Yacubowicz and M. Narkis, Polymer Engineering and Science—Dielectric Behavior of Carbon Black Filled Polymer Composites, vol. 26, No. 22, pp. 1568–1573 (Dec. 1986).

Mehrdad Ghofraniha and R. Salovey, Polymer Engineering and Science—Electrical Conductivity of Polymers Containing Carbon Black, vol. 28, No. 1, pp. 5863 (Mid–Jan. 1988).

J. Yacubowicz and M. Narkis, Polymer Engineering and Science—Electrical and Dielectric Properties of Segregated Carbon Black–Polyethylene Systems, vol. 30, No. 8, pp. 459–468 (Apr. 1990).

Biing–Lin Lee, Polymer Engineering and Science—Electrically Conductive Polymer Composites and Blends, vol. 32, No. 1, pp. 36–42 (Mid–Jan. 1992).

H.M. Al–Allak, A.W. Brinkman and J. Woods, Journal of Materials Science—I–V Characteristics of Carbon Black–Loaded Crystalline Polyethylene, vol. 28, pp. 117–120 (1993) (No Month).

Hao Tang, et al., Journal of Applied Polymer Science—The Positive Temperature Coefficient Phenomenon of Vinyl Polymer/CB Composites, vol. 48, pp. 1795–1800 (1993) (No Month).

V.A. Ettel, P. Kalal, INCO Specialty Powder Products, Advances in Pasted Positive Electrode, (J. Roy Gordon Research Laboratory, Missisauga, Ont.), Presented at NiCad 94, Geneva, Switzerland, Sep. 19–23, 1994.

F. Gubbels, et al., Macromolecules—Design of Electrical Conductive Composites: Key Role of the Morphology on the Electrical Properties of Carbon Black Filled Polymer Blends, vol. 28 pp. 1559–1566 (1995) (No Month).

Hao Tang, et al., Journal of Applied Polymer Science—Studies on the Electrical Conductivity of Carbon Black Filled Polymers, vol. 59, pp. 383–387 (1996) (No Month).

10
2
155
20
50
40
120
80
80'
130
90
90'
160
170
100
110
70
70'
30
60
150
156
180
185
186
186'
186"
W

SURFACE MOUNTABLE ELECTRICAL DEVICE COMPRISING A PTC AND FUSIBLE ELEMENT

CROSS-REFERENCE TO RELATED APPLICATION

This application is a continuation-in-part of application Ser. Nos. 08/642,597 and 08/642,655 U.S. Pat. No. 5,699, 607 filed May 3, 1996, and 08/884,711 U.S. Pat. No. 5,884,391 and 08/885,084 filed Jun. 30, 1997.

TECHNICAL FIELD

The present invention relates generally to a surface mountable electrical circuit protection device and a method for making the device.

BACKGROUND OF THE INVENTION

It is well known that the resistivity of many conductive materials change with temperature. Resistivity of a positive temperature coefficient ("PTC") material increases as the temperature of the material increases. Many crystalline polymers, made electrically conductive by dispersing conductive fillers therein, exhibit this PTC effect. These polymers generally include polyolefins such as polyethylene, polypropylene and ethylene/propylene copolymers. Certain doped ceramics such as barium titanate also exhibit PTC behavior.

At temperatures below a certain value, i.e., the critical or switching temperature, the PTC material exhibits a relatively low, constant resistivity. However, as the temperature of the PTC material increases beyond this point, the resistivity sharply increases with only a slight increase in temperature.

Electrical devices employing polymer and ceramic materials exhibiting PTC behavior have been used as overcurrent protection in electrical circuits. Under normal operating conditions in the electrical circuit, the resistance of the load and the PTC device is such that relatively little current flows through the PTC device. Thus, the temperature of the device due to $I^2R$ heating remains below the critical or switching temperature of the PTC device. The device is said to be in an equilibrium state (i.e., the rate at which heat is generated by $I^2R$ heating is equal to the rate at which the device is able to lose heat to its surroundings).

If the load is short circuited or the circuit experiences a power surge, the current flowing through the PTC device increases and the temperature of the PTC device (due to $I^2R$ heating) rises rapidly to its critical temperature. At this point, a great deal of power is dissipated in the PTC device and the PTC device becomes unstable (i.e., the rate at which the device generates heat is greater than the rate at which the device can lose heat to its surroundings). This power dissipation only occurs for a short period of time (i.e., a fraction of a second), however, because the increased power dissipation will raise the temperature of the PTC device to a value where the resistance of the PTC device has become so high that the current in the circuit is limited to a relatively low value. This new current value is enough to maintain the PTC device at a new, high temperature/high resistance equilibrium point, but will not damage the electrical circuit components. Thus, the PTC device acts as a form of a fuse, reducing the current flow through the short circuit load to a safe, relatively low value when the PTC device is heated to its critical temperature range. Upon interrupting the current in the circuit, or removing the condition responsible for the short circuit (or power surge), the PTC device will cool down below its critical temperature to its normal operating, low resistance state. The effect is a resettable, electrical circuit protection device.

Particularly useful devices of this type generally include a PTC element sandwiched between a pair of laminar electrodes. In order to connect devices of this type to other electrical components, terminals are commonly soldered to the electrode. The soldering process, however, can adversely affect the resistance of a polymeric PTC element. Moreover, since electrical connection generally occurs on opposing sides of the PTC element, devices of this type commonly take up more space on a PC board than is necessary.

SUMMARY OF THE INVENTION

We have now discovered that important advantages result from making electrical connection to both electrodes from the same side of the PTC device. The wrap-around configuration of the PTC devices of the present invention allow one to make an electrical connection to an electrode on the opposite side of the PTC device. Further, since electrical devices of the present invention make electrical connection by wrapping a conductive layer around the PTC element rather than putting a conductive layer through an aperture in the PTC element, the device utilizes more cross-sectional area of the PTC element, resulting in higher-rated devices.

Moreover, the manufacturing steps necessary to produce electrical devices according to the present invention allow for numerous strips to be prepared simultaneously, with the final strips ultimately divided into a plurality of electrical devices. This process makes it possible to reduce the size and, hence, the resistance of the electrical devices of the present invention.

In a first aspect of the present invention there is provided a device for protecting an electrical circuit. The device comprises a resistive element having a first and a second surface. A first electrode is in electrical contact with the first surface of the resistive element and a second electrode is in electrical contact with the second surface of the resistive element. A first end termination electrically connects the circuit and the first electrode. A second end termination electrically connects the second electrode and the circuit. An electrically insulating layer is interposed between the first and second end terminations and is in contact with the first and second electrodes.

In a second aspect of the present invention there is provided a device for protecting an electrical circuit. The device comprises a conductive polymer PTC element having a first and a second surface and a first and a second side wall. A first electrode is in electrical contact with the first surface of the PTC element and a second electrode is in electrical contact with the second surface of the PTC element. A first end termination electrically connects the circuit and the first electrode and is in contact the first side wall of the PTC element. A second end termination electrically connects the second electrode and the circuit and is in contact with the second side wall of the PTC element. An electrically insulating layer is interposed between the first and second end terminations and is in contact with the first and second electrodes.

In a third aspect of the present invention there is provided an electrical device for protecting a circuit. The device includes a resistive element in series with a fusible element. The resistive element has a first and a second surface. A first electrode is in electrical contact with the first surface of the PTC element and a second electrode is in electrical contact with the second surface of the PTC element. A first end termination provides electrical connection between the circuit and the first electrode. The fusible element is electrically connected in series with the PTC element. A second end termination provides electrical connection between the fusible element and the circuit.

In a fourth aspect of the present invention there is provided a device for protecting an electrical circuit. The device includes a PTC element in series with a fusible element. The PTC element comprises a conductive polymer and includes first and a second surfaces and first and second side walls. A first electrode is in electrical contact with the first surface of the PTC element and a second electrode is in electrical contact with the second surface of the PTC element. A first end termination provides electrical connection between the circuit and the first electrode and is in contact with the first side wall of the PTC element. The fusible element is electrically connected in series with the PTC element. A second end termination provides electrical connection between the fusible element and the circuit and is in contact with the second side wall of the PTC element.

BRIEF DESCRIPTION OF THE DRAWINGS

A better understanding of the present invention will be had upon reference to the following detailed description and accompanying drawings. The size and thickness of the various elements illustrated in the drawings has been greatly exaggerated to more clearly show the electrical devices of the present invention.

DETAILED DESCRIPTION OF THE INVENTION

Figures 1, 2, 3, 4, 5:
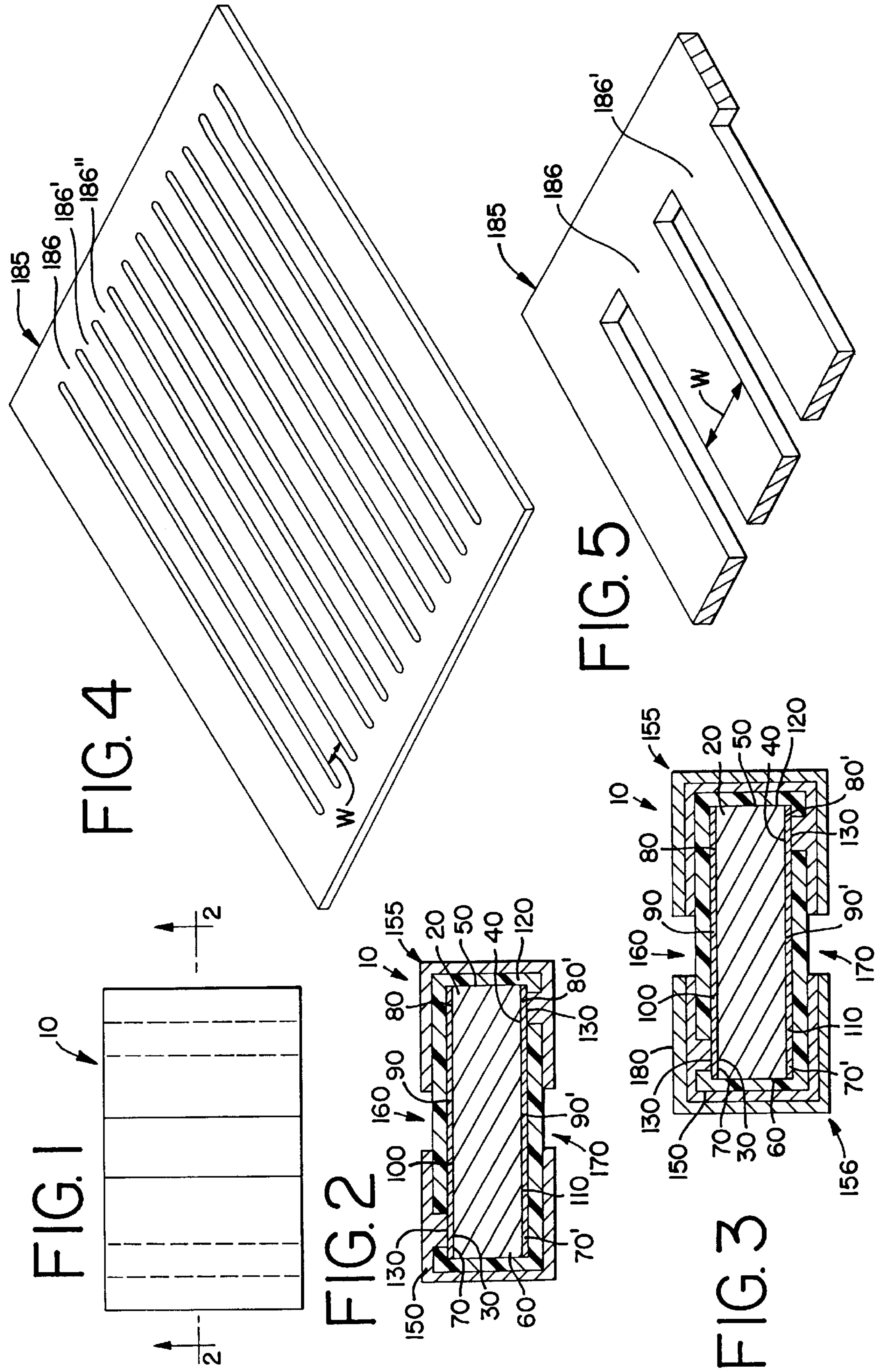
FIG. 1 is a top view of an electrical device according to the present invention.
FIG. 2 is a cross-sectional view along line a—a of a first embodiment of the electrical device illustrated in FIG. 1.
FIG. 3 is a cross-sectional view along line a—a of a second embodiment of the electrical device illustrated in FIG. 1.
FIG. 4 is a perspective view of a laminar PTC sheet having a plurality of strips created in a regular pattern.
FIG. 5 is a partial enlarged perspective view of the laminar PTC sheet having a plurality of strips as illustrated in FIG. 4.

While this invention is susceptible of embodiment in many different forms, there is shown in the drawings and will herein be described in detail preferred embodiments of the invention with the understanding that the present disclosure is to be considered as an exemplification of the principles of the invention. For example, the present invention will be described below generally with reference to a polymer PTC element having electrodes formed on the top and bottom surfaces. It is to be understood, however, that the present invention contemplates electrical devices with a ceramic PTC element, or a resistive element that does not exhibit PTC characteristics.

Generally, the resistive element of the present invention will be composed of a PTC composition comprised of a polymer component and a conductive filler component. The polymer component may be a single polymer or a mixture of two or more different polymers. The polymer component may comprise a polyolefin having a crystallinity of at least 40%. Suitable polymers include polyethylene, polypropylene, polybutadiene, polyethylene acrylates, ethylene acrylic acid copolymers, and ethylene propylene copolymers. In a preferred embodiment, the polymer component comprises polyethylene and maleic anhydride (such a polymer is manufactured by Du Pont and sold under the tradename Fusabond™). The conductive filler component is dispersed throughout the polymer component in an amount sufficient to ensure that the composition exhibits PTC behavior. Alternatively, the conductive filler can be grafted to the polymer. Generally, the conductive filler component will be present in the PTC composition by approximately 25–75% by weight. Suitable conductive fillers to be used in the present invention include powders, flakes or spheres of the following metals; nickel, silver, gold, copper, silver-plated copper, or metal alloys. The conductive filler may also comprise carbon black, carbon flakes or spheres, or graphite. In a preferred embodiment, the conductive filler component used in the present invention is carbon black (manufactured by Columbian Chemicals and sold under the tradename Raven™). Particularly useful PTC compositions have a resistivity at approximately 25° C. of less than 10 ohm cm, particularly less than 5 ohm cm, and especially less than 3 ohm cm. Suitable PTC compositions for use in the present invention are disclosed in U.S. patent application Ser. No. 08/614,038, and U.S. Pat. Nos. 4,237,441, 4,304,987, 4,849,133, 4,880,577, 4,910,389 and 5,190,697.

The PTC element has a first electrode in electrical contact with the top surface and a second electrode in electrical contact with the bottom surface. The electrodes may be in direct physical contact with the top and bottom surfaces of the PTC element, however, electrical devices of the present invention may also include a conductive adhesive composition which lies between the electrodes and the PTC element.

In a preferred embodiment, the PTC element is sandwiched between two metal foil electrodes to form a laminate. Alternatively, the electrodes can be formed on the top and bottom surfaces of the PTC element using conventional electroless or electrolytic plating processes. The first and second electrodes preferably comprise a metal selected from the group consisting of nickel, copper, silver, tin, gold and alloys thereof.

Embodiment Illustrated in FIGS. 1–3

With reference now to FIGS. 1–3, the electrical device 10 of the present invention comprises a resistive element 20 having a top surface 30, a bottom surface 40, a first side 50 and a second side 60. Both the top and bottom surfaces 30, 40 have two end portions 70, 80 and 70', 80' separated by mid-portions 90, 90'. A first electrode 100 is formed on the top surface 30 of resistive element 20 and a second electrode 110 is formed on the bottom surface 40 of resistive element 20. As previously mentioned, preferably resistive element 20 is composed of a polymer PTC composition.

An insulating layer 120 is formed on electrodes 100, 110 and the first side 50 and the second side 60 of the resistive element 20. The insulating layer 120 can be composed of a photo resist material, a dielectric material, a ceramic material, a solder mask, or any electrically non-conductive material. The insulating layer 120 has a portion removed from the first electrode 100 to define a first contact point 130 and a portion removed from the second electrode 110 to define a second contact point 140. In the preferred embodiments illustrated in FIGS. 2–3, the first contact point 130 is adjacent the end portion 70 of the top surface 30 of the resistive element 20, while the second contact point 140 is adjacent the end portion 80' of the bottom surface 40 of the resistive element 20 (i.e., the first and second contact points 130, 140 are located on opposite sides and opposite ends of the electrical device 10). While this configuration is preferred, the present invention covers electrical devices having contact points located anywhere along the first and second electrodes provided that electrical connection can be made to both electrodes from the same side of the electrical device.

A first conductive layer 150 is formed on the insulating layer 120 and makes electrical contact with the first and second electrodes 100, 110 at first and second contact points 130, 140. Conductive layer 150 may be comprised of any conductive material, but preferably comprises a metal selected from the group consisting of copper, tin, silver, nickel, gold and alloys thereof. It is important that the first conductive layer wrap-around the sides of the electrical device. This wrap-around configuration allows for electrical connection to be made to both electrodes from the same side of the electrical device.

The first conductive layer 150 has portions removed from insulating layer 120 to form end terminations 155, 156. Each end termination includes a contact point. The end terminations 155, 156 are separated by electrically non-conductive gaps 160, 170. FIGS. 2–3 illustrate an electrical device 10 wherein the electrically non-conductive gaps 160, 170 are formed adjacent the mid-portions 90, 90' of the top and bottom surfaces 30, 40 of resistive element 20. It should be understood, however, that the electrically non-conductive gaps 160, 170 can be formed anywhere in the first conductive layer 150 as long as the electrically non-conductive gaps separate end terminations 155, 156, with each end termination including a contact point. This configuration prevents current from flowing circularly around the electrical device. Instead, current may flow around either end portion of the electrical device via an end termination, to the first contact point, and through the resistive element to the second contact point formed on the opposite side of the electrical device.

The electrically non-conductive gaps 160, 170 can be formed by a conventional etching process. In FIGS. 2–3, the non-conductive gaps 160, 170 are left vacant, thus exposing insulating layer 120. Alternatively, the non-conductive gaps 160, 170 can be filled with any electrically non-conductive material.

Referring specifically to FIG. 3, in a preferred embodiment of the present invention, a second conductive layer 180 is formed on the first conductive layer 150. The second conductive layer should not bridge non-conductive gaps 160, 170 or any electrically non-conductive material which might fill the non-conductive gaps 160, 170. The second conductive layer 180 is preferably a solder composition which allows the device 10 to be easily connected to the conductive terminals of a PC board. By completely coating the first conductive layer 150 with the second conductive layer 180, the electrical device 10 of the preferred embodiment is symmetrical. Accordingly, the device 10 does not need to be oriented in a special manner before it is mounted to a PC board or connected to additional electrical components. It should be understood, however, that the present invention covers an electrical device 10 where the second conductive layer 180 contacts only a portion of the first conductive layer 150, or is in contact with the first conductive layer 150 on one side of the device only, i.e., a non-symmetrical device.

Electrical devices of the present invention have a resistance at approximately 25° C. of less than 1 ohm, preferably less than 0.5 ohm, and especially less than 0.2 ohm.

Embodiments Illustrated in FIGS. 4–5

The electrical devices of the present invention can be manufactured in various ways. However, as illustrated in FIG. 4, the preferred method provides for carrying out the processing steps on a relatively large laminar sheet 185 which comprises a plurality of strips 186, 186', 186", etc. The final processing step includes dividing the strips into a plurality of electrical devices. Accordingly, extremely small electrical devices with low resistances can be produced in an economical fashion.

In a preferred method, electrodes are formed on the top and bottom surfaces of a solid laminar PTC sheet of convenient size. As previously mentioned, preferably the PTC sheet is laminated between two metal foil electrodes. Alternatively, electrodes may be plated directly on the top and bottom surfaces of the PTC sheet using conventional electrolytic or electroless plating processes. Referring to FIG. 4, the terminated laminar PTC sheet is then routed or punched to create a plurality of strips 186, 186', 186", etc. The strips are created in a regular pattern and preferably have a width, W, approximately the desired length of the final electrical device. For example, a laminar PTC sheet approximately 6 inches wide by 8 inches long by 0.0150 inches thick may be routed or punched to create a plurality of strips 186, 186', 186", etc. approximately 7 inches in length with a width of approximately 0.160–0.180 inches or less. The top and bottom surfaces of each strip are composed of the first and second electrodes 100, 110. The side surfaces of each strip are composed of PTC element 20 due to the routing or punching procedure.

Figure 4A:
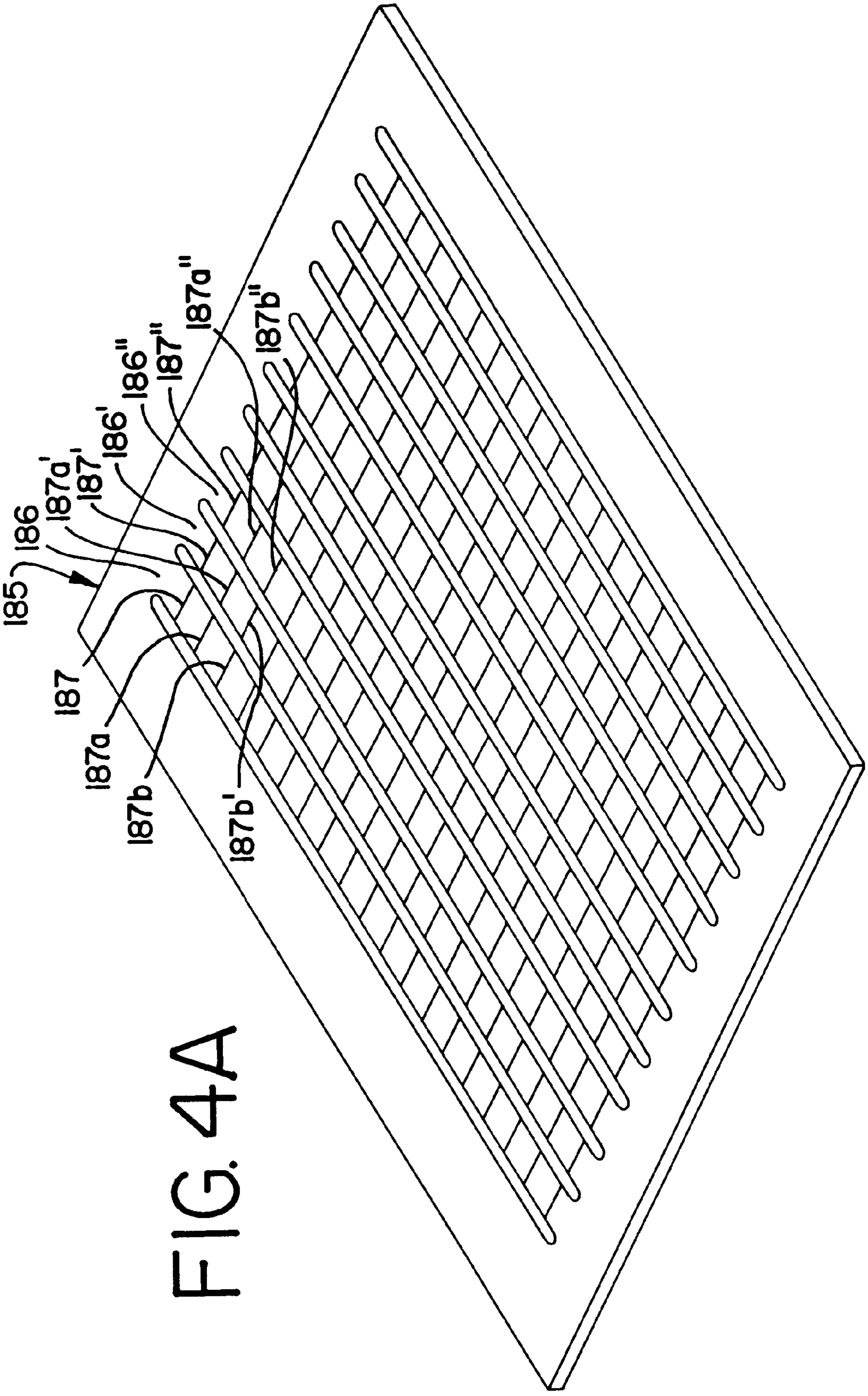
FIG. 4A is a perspective view of the laminar PTC sheet illustrated in FIG. 4 having a plurality of break points created on each strip.

After the laminated PTC sheet is routed, a plurality of break points 187, 187', 187" . . . 187*a*, 187*a*', 187*a*" . . . 187*b*, 187*b*', 187*b*" . . . etc. are created horizontally across each strip (FIG. 4A). The break points allow the final strips to be divided into a plurality of electrical devices by exerting minimal pressure at each break point. Thus, the final strips can be efficiently divided into a plurality of electrical devices by snapping or simply running the strip over an edge. Laboratory tests have indicated that without break points, the conductive layers (described in detail below) tend to smear upon dividing the strips into electrical devices with conventional dicing and shearing techniques. Smeared conductive layers lead to faulty electrical devices and the increased possibility of short circuits.

Generally, the break points are created by removing portions of the electrodes on both the top and bottom surfaces of each strip. This can be accomplished by laminating the routed, terminated PTC sheet illustrated in FIG. 4 with a dry film photo resist material. A masking material is laid over the portions of the photo resist material which are to be developed or cured, leaving a plurality of unmasked regions approximately 5 mils thick stretching horizontally across each strip. Preferably, the unmasked regions are formed on the routed, terminated laminar PTC sheet in the same direction as the direction in which the PTC composition was extruded. Since the polymer chains in the PTC composition are elongated in the direction of extrusion, the brittleness of the PTC sheet is anisotropic. That is, the PTC sheet is stronger in one direction (i.e., perpendicular to the direction of extrusion) than it is in the direction parallel to extrusion. Thus, by creating the break points parallel to the direction of extrusion, the final strips may be easily divided into a plurality of electrical devices.

The unmasked regions should be created to leave a plurality of masked portions having a dimension approximately equal to the desired width of the final electrical device, e.g., 0.100–0.150 inches or less. The strips are then exposed to ultraviolet light whereby the unmasked regions of the photo resist material degrade. The degraded photo resist material is rinsed away to expose portions of the electrode surfaces. The exposed portions of the electrodes are then removed by a conventional etching process (e.g., subjecting the exposed electrode surfaces to a ferric chloride solution), thus, creating a plurality break points. Finally, the developed or cured dry film photo resist material is chemically removed by dipping the PTC sheet into a solvent such as potassium hydroxide.

FIG. 5 illustrates a partial enlarged cross-sectional view of several strips of the laminar PTC sheet. While the various process steps are to be carried out after the break points have been formed on the routed PTC sheet, for purposes of clarity, the various process steps will be discussed with reference to a cross-section of a single strip (illustrated in FIGS. 6A–6H and 7A–7D).

Embodiment Illustrated in FIGS. 6A–6H

Figure 6A:
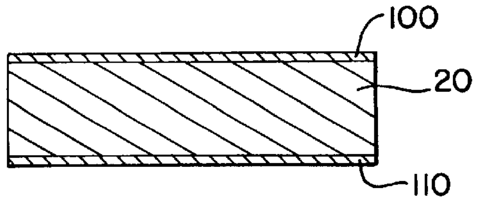
FIGS. 6A–6H illustrate the various steps of a preferred method of manufacturing electrical devices of the present invention, as applied to a cross-section of a single strip of the PTC sheet in FIG. 4A.
Figure 6B:
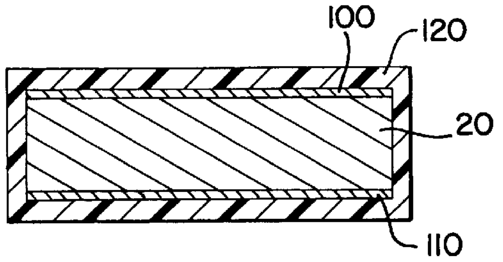

After the break points have been created on each strip of the routed, terminated laminar PTC sheet (FIG. 6A), the strips of the laminar PTC sheet are coated with an insulating layer 120 (FIG. 6B). The insulating layer 120 may be applied using any one of the following conventional techniques: brushing, laminating, dipping, screen printing or spraying. The insulating layer 120 may comprise any electrically non-conductive material, however, preferred materials include a photo resist material, a ceramic material, a dielectric material, or a solder mask.

Figure 6C:
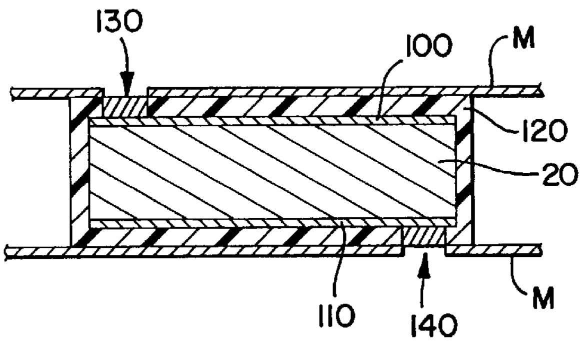
Figure 6D:
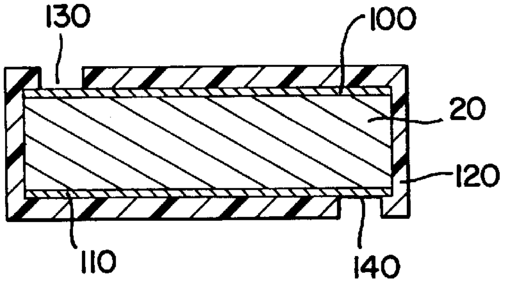

A plurality of contact points 130, 140, are formed in a regular pattern on the top and bottom surfaces of each strip (FIGS. 6C–6D). It should be understood that the present invention covers methods where the insulating layer 120 is applied to the strips leaving portions of the electrodes 100, 110 initially exposed to create the contact points 130, 140. Additionally, the present invention covers methods where the insulating layer 120 is initially applied to the entire surface of each strip. Contact points 130, 140 are then formed by removing portions of the insulating layer 120. For example, referring to FIGS. 6B–6D, a positive working photo resist material is used as the insulating layer 120. A mask, reference letter M in FIG. 6C, is applied to the portions of the photo resist material which are to be developed or cured on the surfaces of each strip, leaving portions of the photo resist material which will form the contact points 130, 140 unmasked (shown as cross-hatched portions of the insulating layer in FIG. 6C). The strips are then exposed to ultraviolet light whereby the unmasked portions of the photo resist material degrade. The degraded photo resist material is rinsed away to expose the electrode surfaces (FIG. 6D), thus, forming a plurality of contact points on the top and bottom surfaces of each strip. This process can be reversed using a negative photo resist material (i.e., the unmasked portions will develop or cure upon exposure to ultraviolet light).

Figure 6E:
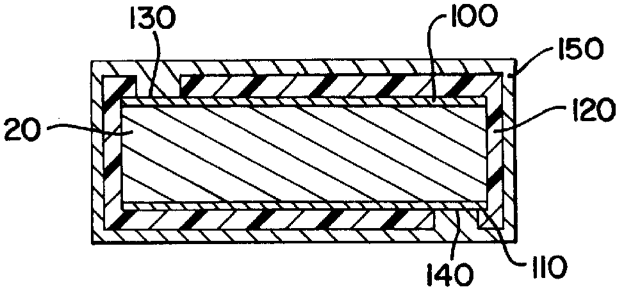

After the plurality of contact points 130, 140 has been formed, a first conductive layer 150 is applied to the strips (FIG. 6E). The conductive layer 150 may be applied by a conventional plating technique (e.g., electroless plating). Alternatively, the conductive layer may be applied by dipping, spraying or brushing a conductive material to the strips in a liquid form. In a preferred embodiment the first conductive layer 150 comprises a metal selected from the group consisting of nickel, copper, tin, silver, gold or alloys thereof. The first conductive layer 150 must make electrical contact with the electrodes 100, 110 at each contact point formed on the strips.

As illustrated in FIGS. 2–3 and 6E, the first conductive layer 150 wraps around the end portions of the electrical device 10. This wrap-around configuration makes it possible to make electrical contact to both electrodes from the same side of the electrical device.

Figure 6F:
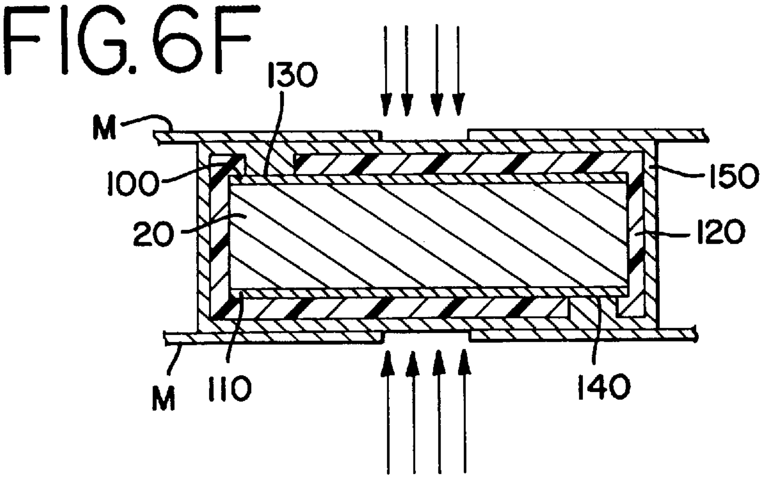
Figure 6G:
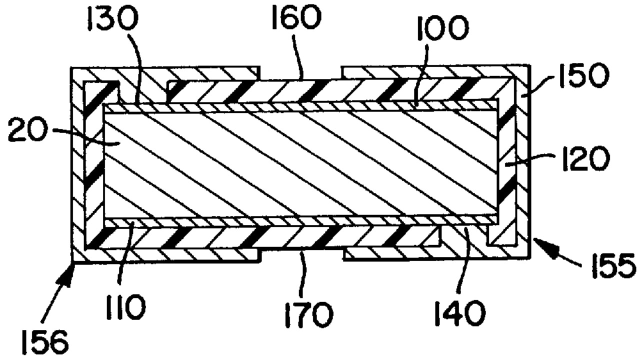

In the next step, a plurality of electrically non-conductive gaps 160, 170 are formed in the first conductive layer 150 in a regular pattern on the top and bottom surfaces of each strip (FIGS. 6F–6G). The electrically non-conductive gaps 160, 170 may be formed by applying the first conductive layer 150 initially in a manner which leaves portions of the insulating layer 120 exposed. However, the present invention also covers methods where each strip is completely covered with the first conductive layer 150 and the electrically non-conductive gaps 160, 170 are created by removing portions of the first conductive layer 150 in a regular pattern on the top and bottom surfaces of each strip. Either process results in forming on each strip a plurality of first and second end terminations 155, 156 separated by the electrically non-conductive gaps 160, 170.

For example, with reference to FIGS. 6E–6G, a protective mask, reference letter M in FIG. 6F, is applied to the conductive layer 150, leaving predetermined portions exposed (the exposed portions are represented by the cross-hatched sections of the conductive layer 150 in FIG. 6F).

The exposed portions are then removed by a conventional etching process, e.g., subjecting the exposed portions to a ferric chloride solution.

Embodiment Illustrated in FIGS. 7A–7D

Figure 7A:
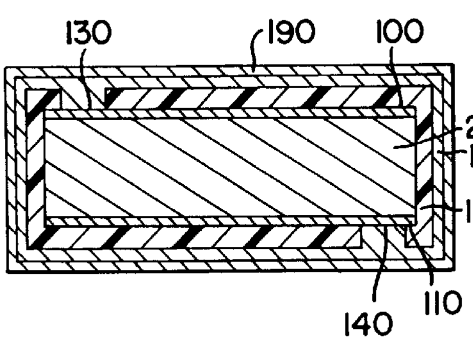
FIGS. 7A–7D illustrate the steps of a second preferred method of manufacturing electrical devices of the present invention, starting with the device illustrated in FIG. 6E.
Figure 7B:
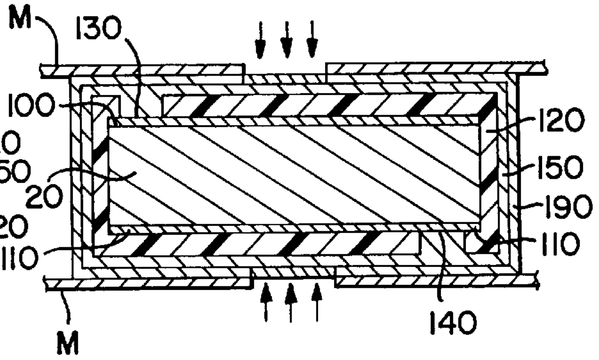
Figure 7C:
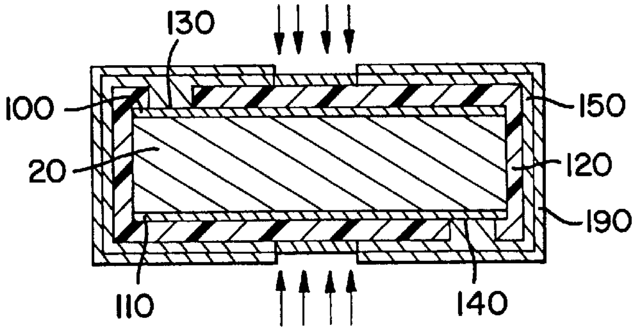
Figure 7D:
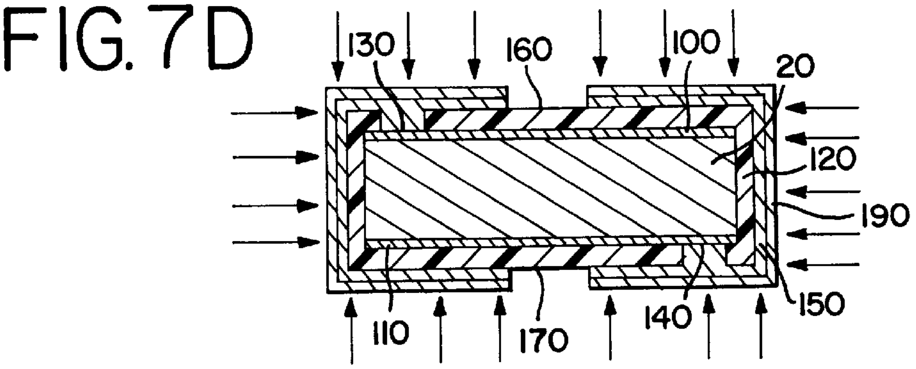

Alternatively, the electrically non-conductive gaps 160, 170 and end terminations 155, 156 can be formed by the following method. First conductive layer 150 is applied to each strip, coating insulating layer 120 and contact points 130, 140 (FIG. 6E). Referring now to FIGS. 7A–7D, a photo resist material 190 is applied to the conductive layer 150. If a photo resist material is used to form insulating layer 120, then the second photo resist material 190 used in this step must have an opposite reaction to ultraviolet light (i.e., if a negative-working photo resist material was used to form the insulating layer, than a positive-working photo resist material must be used to form the electrically non-conductive gaps in the conductive layer and vice-versa). A masking material, reference letter M in FIG. 7B, is applied to the outer photo resist layer 190, leaving a plurality of portions of the top and bottom surfaces of the layer 190 exposed in a regular pattern. The strips are then subjected to ultraviolet light, causing the unmasked portions of the outer photo resist layer 190 to degrade. The degraded portions of the photoresist material 190 are rinsed away, leaving a plurality of portions of the first conductive layer 150 exposed in a regular pattern on the top and bottom surfaces of each strip (FIG. 7C). The exposed portions of the conductive layer 150 (shown as cross-hatched sections of the conductive layer in FIG. 7C) are then removed by dipping the strips in a standard etching solution. As a result, portions of insulating layer 120 are exposed. The outer photo resist material 190 is then removed by further exposing the strips to ultraviolet light (FIG. 7D). Since portions of the insulating layer 120 are exposed during this step, it is important to use a photo resist material 190 which has an opposite reaction to ultraviolet light than the photo resist material that may have been used to form insulating layer 120.

As a result of either process, i.e., (1) applying the conductive layer to the entire surface of the strips and then removing portions of the conductive layer or, (2) initially applying the conductive layer in a manner which leaves portions of the insulating layer exposed, first and second end terminations 155, 156 are formed (FIG. 6G).

Figure 6H:
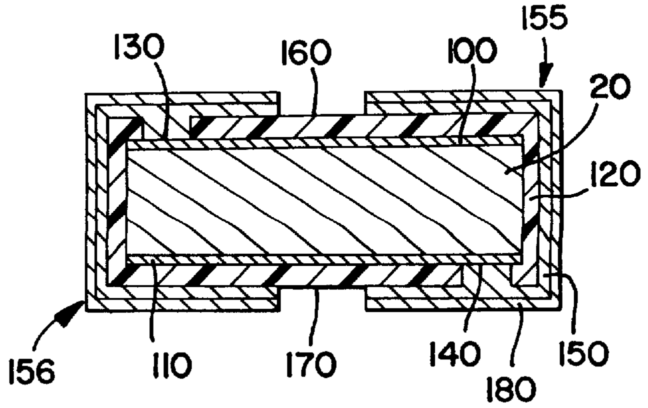

In the preferred embodiment illustrated in FIGS. 3 and 6H, a second conductive layer 180 is applied to the first conductive layer 150. The second conductive layer 180 is preferably comprised of a solder composition and can be applied by any conventional process, including electrolytic plating or solder dipping. The layer of solder permits the electrical devices 10 of the present invention to be easily connected to the conductive terminals of a PC board.

In the final step, the strips are divided at each break point into a plurality of electrical devices such that each device has a contact point and an electrically non-conductive gap on both sides (i.e., top and bottom) of the device. As previously mentioned, the strips may be divided into a plurality of electrical devices by simply applying a minimal amount of pressure at each break point.

Figure 8:
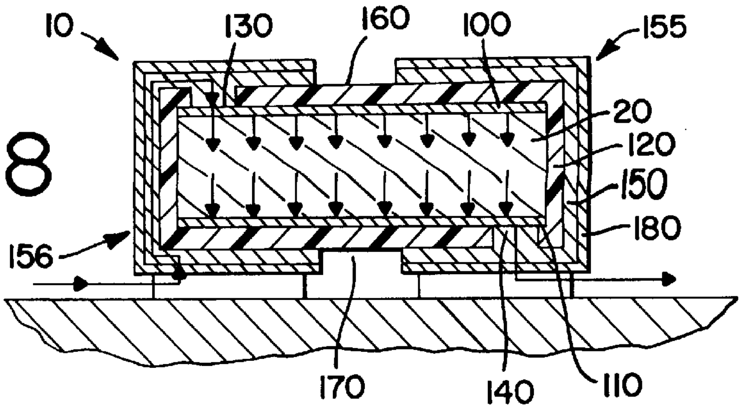
FIG. 8 is a cross-sectional view of a preferred embodiment of the device in FIG. 1 soldered to a PC board.

Embodiment Illustrated in FIG. 8

With reference to FIG. 8, the arrows indicate the flow of current through the device. The end terminations allow current to flow from a conductive terminal of a PC board, around the outer edge of the device (via the first end termination), to the first electrode at the first contact point. The current then flows through the PTC element to the second electrode. Current exits the device through the contact point of the second end termination and continues to flow through the remainder of the circuit.

Embodiment Illustrated in FIGS. 9A–9G

In another preferred method, electrodes are formed on the top and bottom surfaces of a solid laminar PTC sheet of convenient size. A plurality of break points are also formed as previously described. The process steps for formation of the final electrical device of this embodiment are now described with reference to a cross-section of a single strip (illustrated in FIGS. 9A–9G and 10).

Figure 9A:
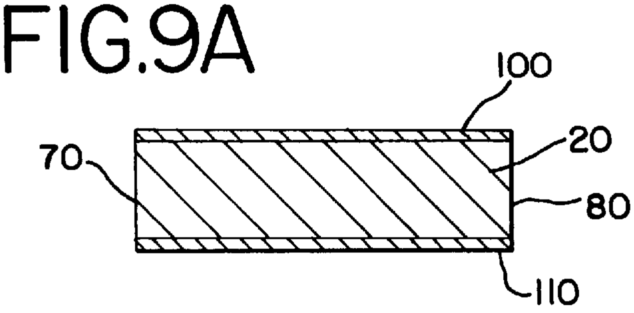
FIGS. 9A–9G illustrate the steps of a third preferred method of manufacturing electrical devices of the present invention as applied to a cross-section of a single strip of the PTC sheet in FIG. 4A.
Figure 9B:
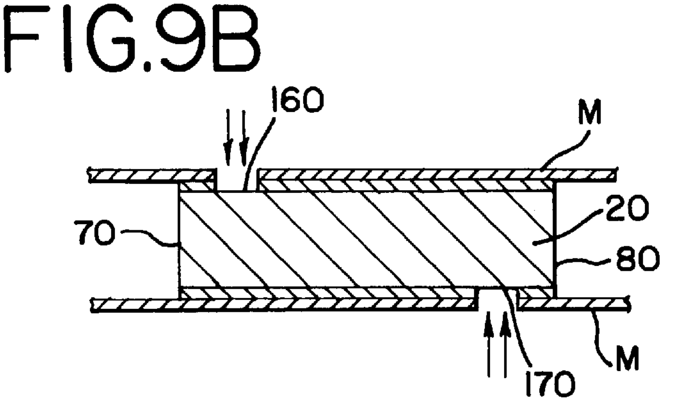

A masking material, reference letter M in FIG. 9B, is applied to the electrodes 100, 110, leaving a plurality of unmasked regions horizontally across each electrode. As previously described, the unmasked portions of the first and second electrodes 100, 110 are then removed by a conventional etching process (e.g., subjecting the exposed electrode surfaces to a ferric chloride solution), thus, creating a plurality of electrically non-conductive gaps 160, 170 in the first and second electrodes. Forming electrically non-conductive gaps 160, 170 directly in the first and second electrodes 100, 110 results in fewer process steps required for the formation of the electrical device 10 of this embodiment.

Figure 9C:
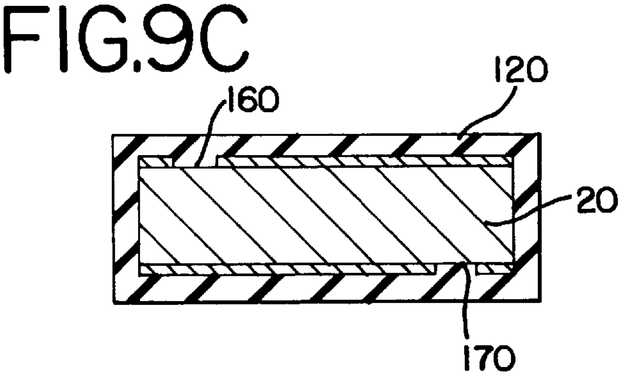

After creation of the nonconductive gaps 160, 170 on each electrode, the electrodes and the laminated PTC sheet are coated with an insulating layer 120. As shown in FIG. 9C, the insulating layer 120 fills the non-conductive gaps 160, 170. As previously described, the insulating layer 120 may be applied using any one of the following conventional techniques: brushing, laminating, dipping, screen printing or spraying. The insulating layer 120 may comprise any electrically non-conductive material; however, preferred materials include a photo resist material, a ceramic material, a dielectric material, or a solder mask.

Figure 9D:
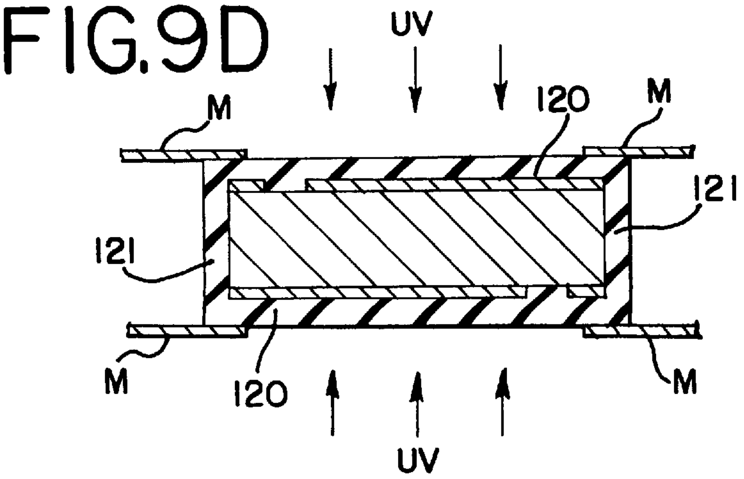
Figure 9E:
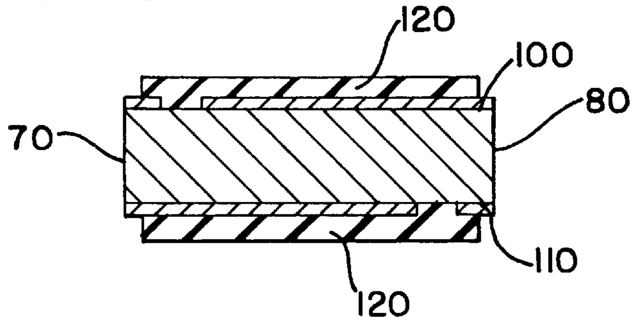

After application of the insulating layer 120, a masking material, reference letter M in FIG. 9D, is applied to the side portions of strip. The masking material covers the insulating layer 120 and stops short of the electrically non-conductive gaps 160, 170, leaving the insulating layer 120 on the two top and bottom middle portions of the PTC element exposed. The result is a masked, U-shaped portion 121 of the insulating layer 120 around each end portion of the PTC element (FIG. 9D). The strip is then exposed to ultraviolet light, causing the unmasked portions of the insulating layer 120 to harden or cure. The masked portions are unaffected by the ultraviolet light and rinsed away with a conventional solvent, leaving the two end portions 70, 80 of the PTC sheet and portions of the first and second electrodes 100, 110 exposed (FIG. 9E).

Figure 9F:
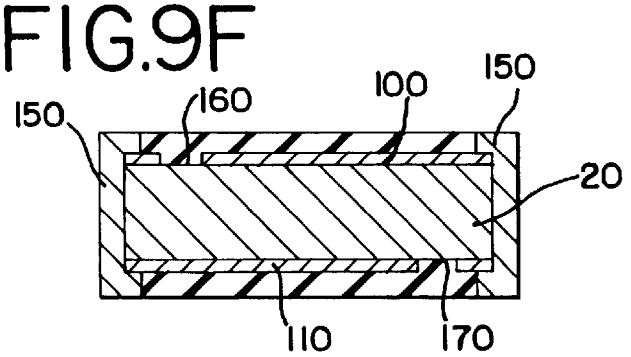

FIG. 9F illustrates the next step in the process wherein a first conductive layer 150 is applied to the exposed ends 70, 80 of the PTC sheet and adjacent to the electrically non-conductive gaps 160, 170 in the electrodes. As previously described, the first conductive layer 150 may be applied by a conventional plating technique (e.g., electrolytic plating). Alternatively, the conductive layer 150 may be applied by electroless plating, direct metallization, or dipping, spraying or brushing a liquid conductive material to the strips. The first conductive layer 150 may comprise a metal selected from the group consisting of nickel, copper, tin, silver, gold or alloys thereof. However, in a preferred embodiment, the first conductive layer 150 is copper. The first conductive layer 150 wraps around the exposed end portions 70, 80 of the electrical device, ending adjacent to the non-conductive gaps 160, 170 formed in the electrodes. The first conductive layer 150 forms first and second end terminations 155, 156 on each end of the device. The end terminations 155, 156 are separated by the electrically non-conductive gaps 160, 170 in the first and second electrodes.

Figure 9G:
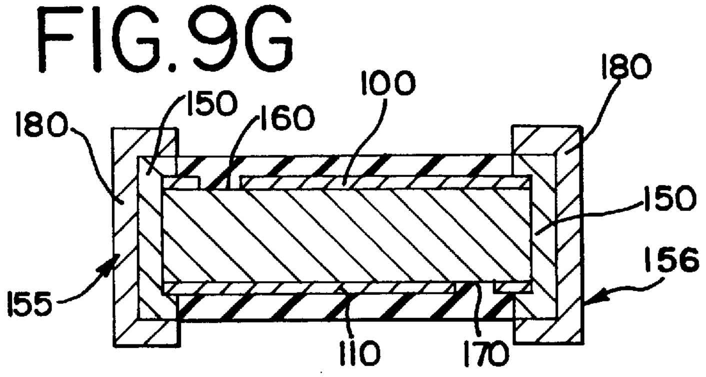

With reference to FIG. 9G, a second conductive layer 180 is applied to the first conductive layer 150. The second conductive layer 180 is preferably comprised of a solder composition (i.e., a tin/lead mixture) and can be applied by any conventional process, including electrolytic plating or solder dipping. The layer of solder permits the electrical devices 10 of the present invention to be easily connected to the conductive terminals of a PC board. To further improve solderability, a nickel layer may be applied to the copper layer prior to the application of the solder layer.

The final step in the process again involves dividing the strips at each break point into a plurality of electrical devices. The strips may also be divided into individual electrical devices by using a conventional shearing or punching process.

Figure 10:
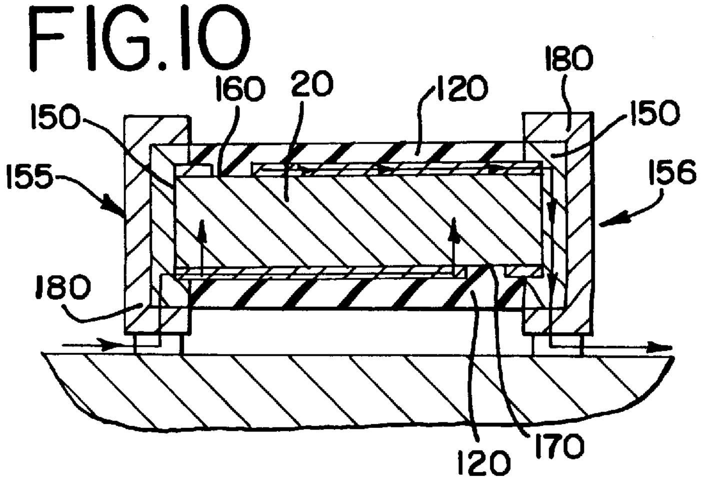
FIG. 10 is a cross-sectional view of a preferred embodiment of the device in FIGS. 9A–9G soldered to a PC board.

Embodiment Illustrated in FIG. 10

With reference to FIG. 10, the arrows indicate the flow of electrical current through the device, which is in a manner different from the previously-described embodiments of the present invention. The first end termination 155 allows current to flow from a conductive terminal of a PC board, up through the second 110 (or bottom) electrode. The current flows through the PTC element 20 to the first 100 (or top) electrode. Current then flows around the second end termination 156, exits the device, and continues to flow through the remainder of the circuit.

Embodiment Illustrated in FIGS. 11A–11G

In another preferred method, electrodes are formed on the top and bottom surfaces of a solid laminar PTC sheet of convenient size. A plurality of break points are also formed as previously described. The process steps for formation of the final electrical device of this embodiment are now described with reference to a cross-section of a single strip (illustrated in FIGS. 11A–11G and 12).

Figure 11A:
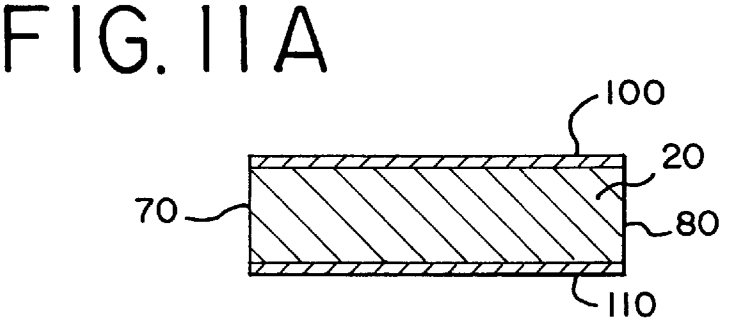
FIGS. 11A–11G illustrate the steps of a fourth preferred method of manufacturing electrical devices of the present invention as applied to a cross-section of a single strip of the PTC sheet in FIG. 4A.
Figure 11B:
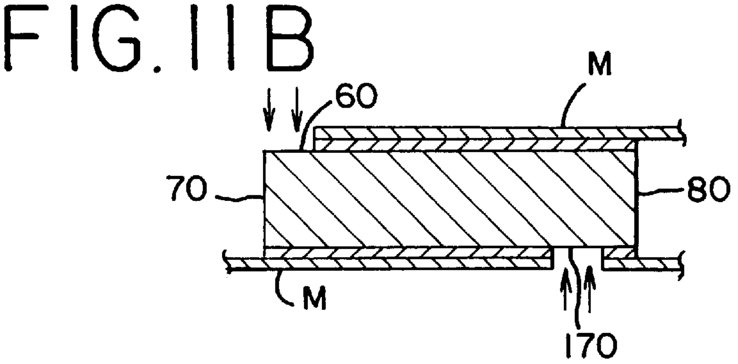

A masking material, reference letter M in FIG. 11B, is applied to the electrodes 100, 110, leaving a plurality of unmasked regions horizontally across each electrode. Optionally, a stencil material having a plurality of blackened areas is laid over the masking material with the blackened areas aligned with the unmasked regions of the electrodes (not shown). The strip is then exposed to ultraviolet light, which penetrates through the stencil material, except the blackened areas, and to the masked portions. The stencil is removed and as previously described, the unmasked portions of the first and second electrodes 100, 110 are then removed by a conventional etching process (e.g., subjecting the exposed electrode surfaces to a ferric chloride solution), thus, creating a plurality of electrically non-conductive gaps 160, 170 in the first and second electrodes. In this preferred embodiment, the non-conductive gap 160 in the first electrode is formed at the end of the electrode adjacent the first end portion 70 of the device (FIG. 11B). Forming electrically non-conductive gaps 160, 170 directly in the first and second electrodes 100, 110 results in fewer process steps required for the formation of the electrical device 10 of this embodiment.

Figure 11C:
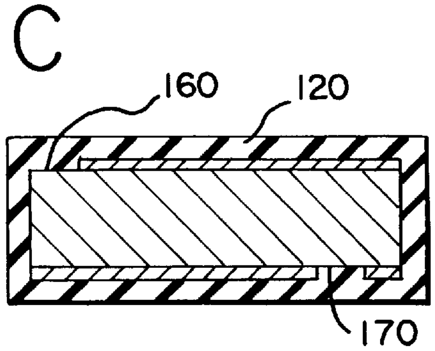

After creation of the non-conductive gaps 160, 170 on each electrode, the electrodes and the laminated PTC sheet are coated with an insulating layer 120. As shown in FIG. 11C, the insulating layer 120 fills the non-conductive gaps 160, 170. The insulating layer 120 is applied by any of the techniques previously described. The insulating layer 120 may comprise any electrically non-conductive material, but preferred materials include a photo resist material, a ceramic material, a dielectric material, or a solder mask.

Figure 11D:
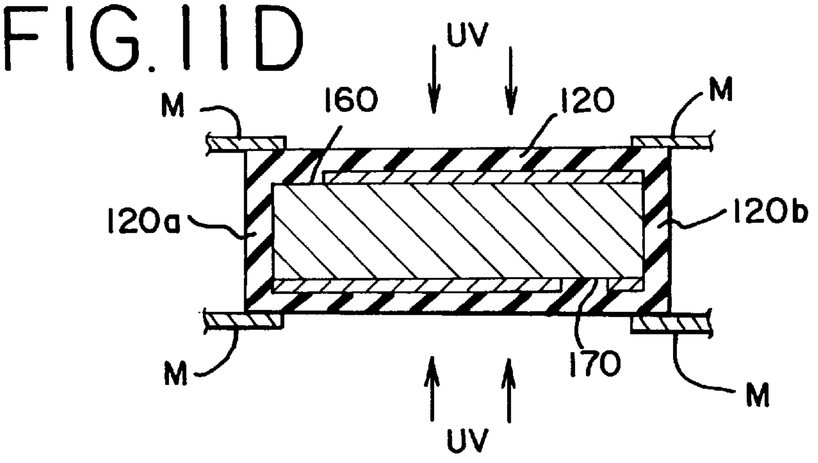
Figure 11E:
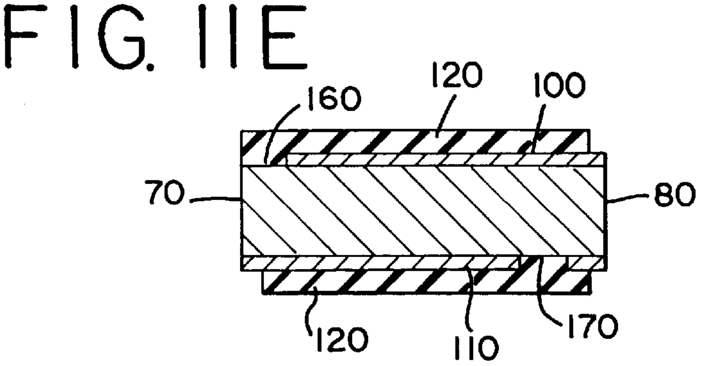

With reference to FIG. 11D, after application of the insulating layer 120, a masking material, reference letter M, is applied to the top and bottom surfaces of each strip. In this preferred embodiment, the masking material covers the insulating layer 120 on the first end portion 70 leaving an L-shaped area 120*a* of insulating material, adjacent the first electrically non-conductive gap 160. On the opposed second end portion 80, the masking material covers the insulating layer falling just short of the second electrically non-conductive gap 170, resulting in a U-shaped area 120*b* of insulating layer (FIG. 11D). The strip is then exposed to ultraviolet light curing the unmasked portions of the insulating layer 120. The masked portions of the insulating layer 120 are rinsed away, leaving the two end portions 70, 80 of the PTC sheet and portions of the first and second electrodes 100, 110 exposed (FIG. 11E).

Figure 11F:
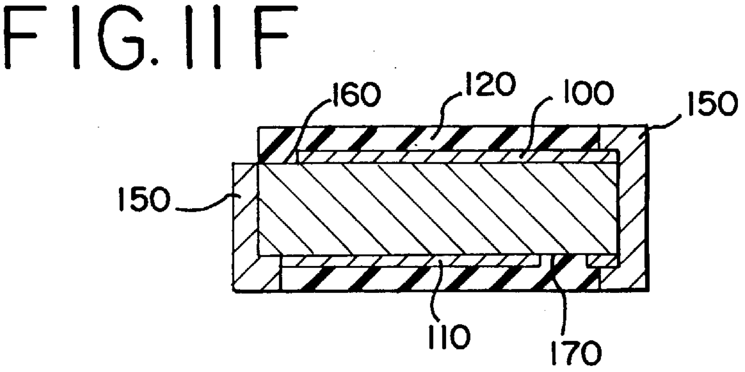

FIG. 11F illustrates the next step in the process wherein a first conductive layer 150 is applied by a conventional plating technique (e.g., electrolytic plating), or alternatively, by dipping, spraying or brushing a liquid conductive material to the strips. The first conductive layer 150 is also in contact with the exposed ends 70, 80 of the PTC sheet and adjacent to the electrically non-conductive gaps 160, 170 in the electrodes. While the first conductive layer 150 may comprise a metal selected from the group consisting of nickel, copper, tin, silver, gold or alloys thereof, in this preferred embodiment, the first conductive layer 150 is copper. The first conductive layer 150 forms an L-shaped end termination 155 around the first end portion 70 of the electrical device, and a U-shaped end termination 156 around the second end portion 80 of the PTC device (FIG. 11F). The end terminations 155, 156 are adjacent to and separated by the electrically non-conductive gaps 160, 170 in the first and second electrodes.

Figure 11G:
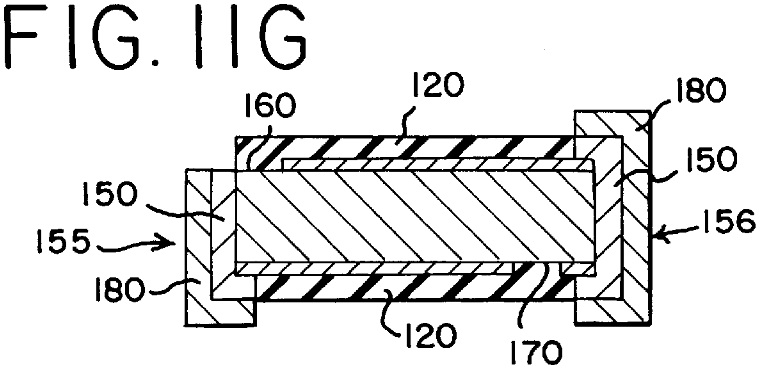

With reference to FIG. 11G, a second conductive layer 180 is applied to the first conductive layer 150. The second conductive layer 180 is preferably comprised of a solder composition (i.e., a tin/lead mixture) and can be applied by any conventional process, including electrolytic plating or solder dipping. The layer of solder permits the electrical devices 10 of the present invention to be easily connected to the conductive terminals of a PC board.

The final step in the process again involves dividing the strips at each break point into a plurality of electrical devices; e.g., shearing, snapping, or punching.

Figure 12:
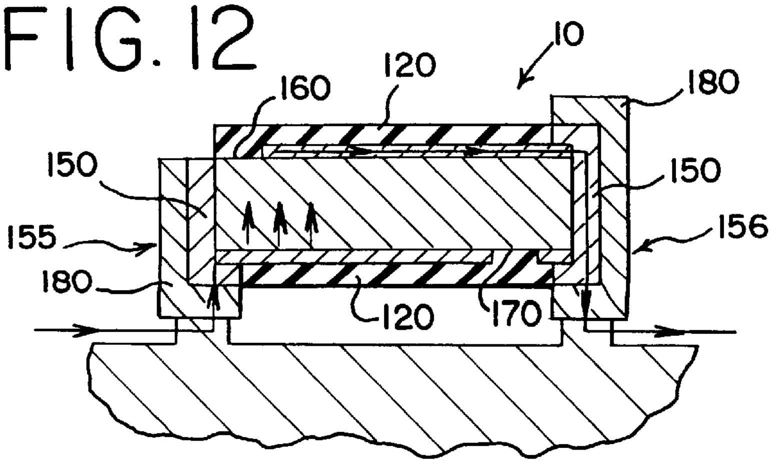
FIG. 12 is a cross-sectional view of a preferred embodiment of the device in FIGS. 11A–11G soldered to a PC board.

Embodiment Illustrated in FIG. 12

With reference to FIG. 12, the arrows indicate the flow of electrical current through the device 10. The end terminations 155, 156 allow current to flow from a conductive terminal of a PC board, up through the second 110 (or bottom) electrode. The current flows through the PTC element 20 to the first 100 (or top) electrode. Current then flows around the U-shaped end termination 156, exits the device, and continues to flow through the remainder of the circuit. While previous embodiments were symmetrically oriented, the device of this embodiment works most efficiently when attached to the circuit board in the manner illustrated in FIG. 12, or where the current enters at the U-shaped end termination 156 and exits via the L-shaped end termination 155.

Figure 13:
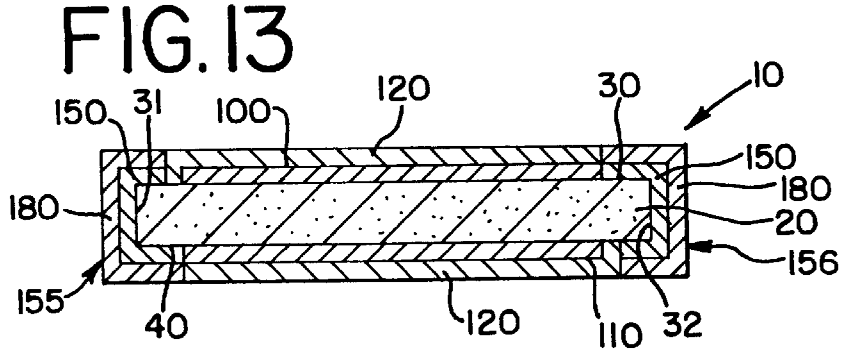
FIG. 13 is a front view of a preferred embodiment of a device for protecting an electrical circuit according to the present invention.

Embodiment Illustrated in FIG. 13

With reference to FIG. 13 there is illustrated a preferred embodiment of a device 10 for protecting an electrical circuit. The device 10 comprises a resistive element 20 having first and second surfaces 30,40, and first and second side walls 31,32. As previously mentioned, preferably the resistive element 20 exhibits PTC behavior and comprises a conductive polymer. A first electrode 100 is in electrical contact with the first surface 30 of the resistive element 20 and a second electrode 110 is in electrical contact with the second surface 40 of the resistive element 20. The device 10 includes first and second end terminations 155,156. The first end termination 155 electrically connects the circuit to be protected with the second electrode 110. The second end termination 156 electrically connects the first electrode 100 with the circuit to be protected. An electrically insulating layer 120 is interposed between the first and second end terminations 155,156 and is in contact with the first and second electrodes 100,110. The electrically insulating layer 120 acts as a barrier to current flow through the device 10, ensuring that current flows from the first end termination 155 to the second electrode 110, through the resistive element 20 to the first electrode 100, and from the first electrode 100 to the second end termination 156.

In the preferred embodiment of FIG. 13, the electrically insulating layer 120 is formed on the first and second electrodes 100,110. To ensure proper current flow through the device 10, the insulating layer 120 contacts the first and second surfaces 30,40 of the resistive. The contact point with the first surface 30 of the resistive element 20 is intermediate the first end termination 155 and the first electrode 100. The contact point with the second surface 40 of the resistive element 20 is intermediate the second end termination 156 and the second electrode 110.

In the preferred embodiment illustrated in FIG. 13, the first and second end terminations 155,156 are each comprised of a first conductive layer 150 and a second conductive layer 180. The end terminations 155,156 wrap-around the side walls 31,32 of the resistive element 20. In this embodiment, the first conductive layer 150 of the first and second end terminations 155,156 contact a portion of the first and second surfaces 30,40 of the resistive element 20, respectively. In the preferred wrap-around configuration, the first conductive layer 150 of the first and second end terminations 155,156 also contacts the first and second side walls 31,32 of the resistive element 20.

The first end termination 155 must be in electrical contact with the second electrode 110 and the second end termination 156 must be in electrical contact with the first electrode 100. However, in the preferred embodiment of FIG. 13, the first end termination 155 is in direct physical contact with the second electrode 110 and the second end termination 156 is in direct physical contact with the first electrode 100.

The preferred materials for use in the device 10 illustrated in FIG. 13 are the same as those previously discussed in connection with the embodiments illustrated in FIGS. 1–12.

Embodiments Illustrated in FIGS. 14A–14H

The process for manufacturing the device 10 illustrated in FIG. 13 is similar to the process explained above with respect to FIGS. 6A–6H, 7A–7D, 9A–9G and 11A–11G. The process is carried out on a routed laminar PTC sheet as illustrated in FIG. 4A. However, for purposes of clarity, the various process steps will be discussed with reference to a cross-section of a single strip.

Figure 14A:
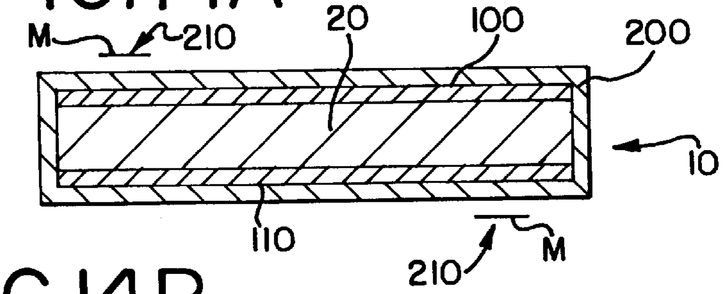
FIGS. 14A–14H illustrate the steps of a preferred method of manufacturing the device illustrated in FIG. 13 as applied to a cross-section of a single strip of the laminar PTC sheet in FIG. 4A.
Figure 14B:
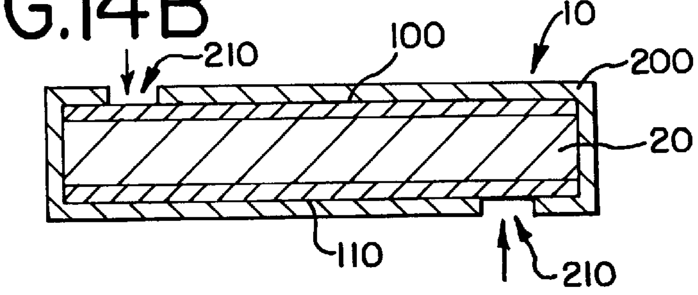
Figure 14C:
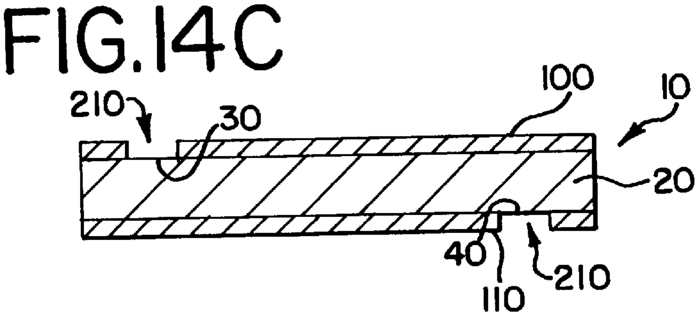

With reference to FIGS. 14A–14C gates 210 are formed in the electrodes 100,110. The routed sheet is precleaned and a photo resist material 200 is applied to each strip of the sheet. A photo resist material 200 is imaged using a mask or photolithographic art work as is well known in the art to define the gates 210 on the top and bottom of the device 10. As will be explained further below, the gates 210 will allow the insulating layer 120 to contact the first and second surfaces 30,40 of the resistive element 20 and form an insulating barrier between the first end termination 155 and the first electrode 100, and the second end termination 156 and the second electrode 110.

The unmasked photo resist material is cured and developed, removing the unmasked material and exposing the electrodes 100,110 under the gates 210 (FIG. 14B). The exposed portions of the electrodes 100,110 are etched away by subjecting the electrode portions to a ferric chloride solution (indicated in FIG. 14B by arrows).

As a result, portions of the first and second surfaces 30,40 of the resistive element 20 are exposed. The remaining photo resist material is then stripped away and the panel is cleaned (FIG. 14C).

Figure 14D:
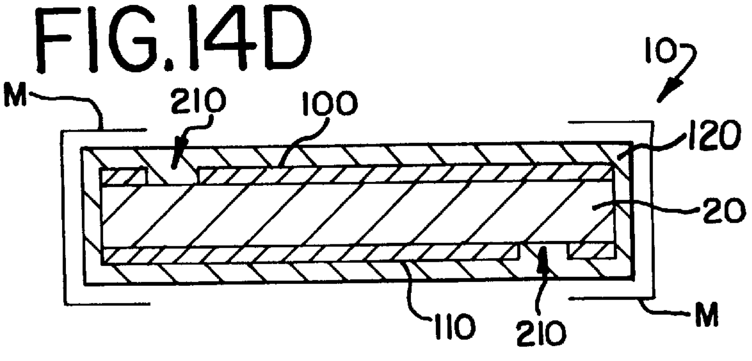
Figure 14E:
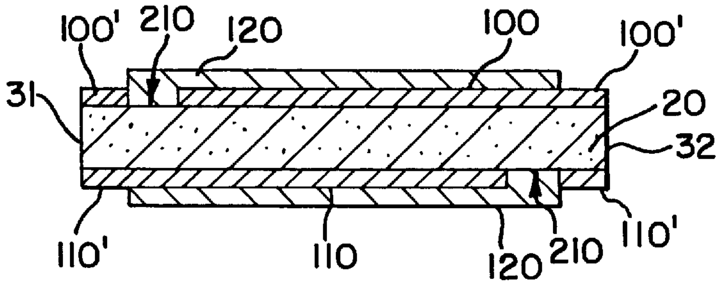
Figure 14F:
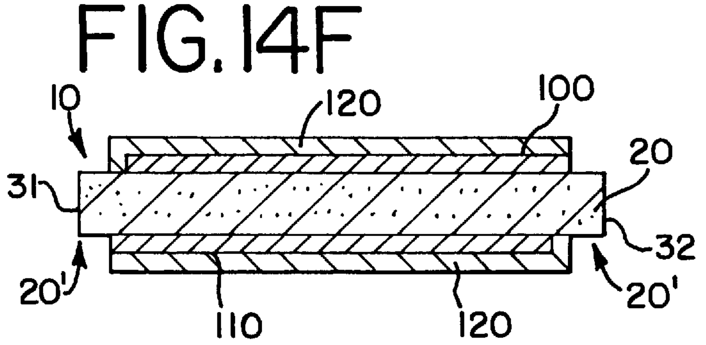

With reference to FIGS. 14D–14F, the end terminations 155,156 are defined. Insulating layer 120 comprising a dielectric material is applied to the device 10 by any conventional method (e.g., screen print or spray application). Solder mask is the preferred dielectric material. The end terminations are imaged onto the solder mask material 120 using a mask or photolithographic art work. As shown in FIG. 14E, the unmasked material 220 is cured and developed, removing the uncured material 220 and exposing portions of electrodes 100',110' and the side walls 31,32 of the resistive element 20. With reference to FIG. 14F, the exposed portions of the electrodes 100',110' are removed by a conventional etching process (e.g., dipping in a ferric chloride solution).

Figure 14G:
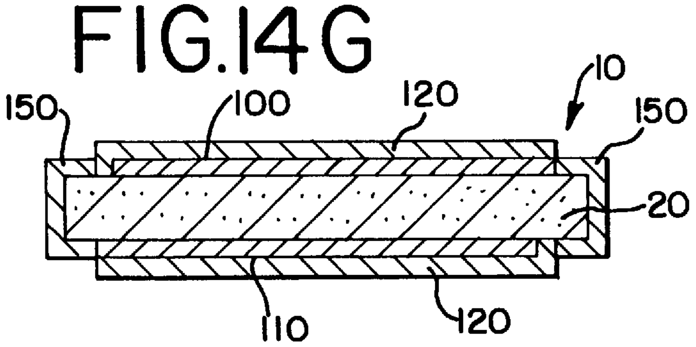
Figure 14H:
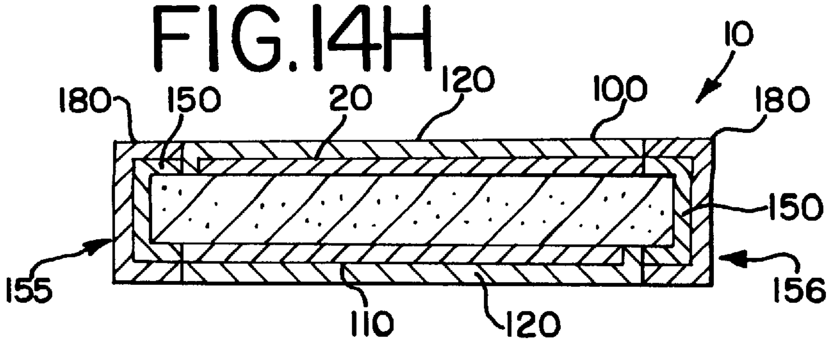

Finally, referring to FIGS. 14G–14H, the first and second end terminations 155,156 are created by depositing a first conductive layer 150 to the exposed end portions (indicated by reference numeral 20' in FIG. 14F) of the resistive element 20. Preferably, the first conductive layer 150 comprises copper and is deposited using a conventional electrolytic plating process and has a thickness of approximately 0.001 inch to approximately 0.0015 inch. To improve the solderability of the device 10 to a conventional PC board, a second conductive layer 180 is applied to the first conductive layer 150 (FIG. 14H). In a preferred embodiment, the second conductive layer 180 comprises a mixture of tin and lead (e.g., solder).

Figure 15:
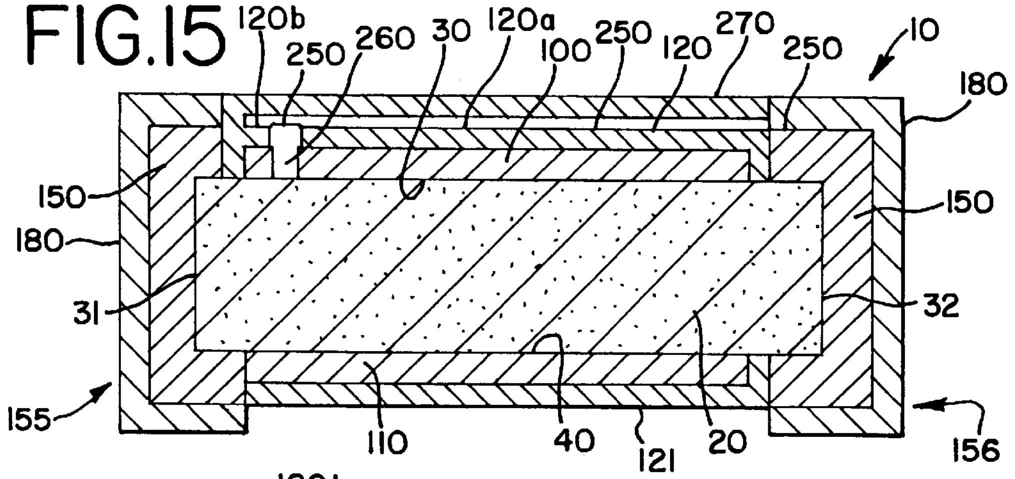
FIG. 15 is a front view of a preferred embodiment of a device for protecting an electrical circuit according to the present invention.

Embodiment Illustrated in FIG. 15

In the preferred embodiment of the present invention illustrated in FIG. 15 there is provided a surface-mountable device 10 for protecting an electrical circuit comprising a resistive element 20 in series with a fusible element 250.

The resistive element 20 has first and second surfaces 30,40 and first and second side walls 31,32. A first electrode 100 is in electrical contact with the first surface 30 and a second electrode 110 is in electrical contact with the second surface 40.

Similar to the embodiment illustrated in FIG. 13, the device shown in FIG. 15 has a first end termination 155 which provides an electrical connection between the circuit to be protected and the second electrode 110. However, since the fusible element 250 is electrically connected in series with the resistive element 20, the second end termination 156 provides an electrical connection between the fusible element 250 and the circuit to be protected.

A first electrically insulating layer 120 is formed on the first electrode 100 and is interposed between the first electrode 100 and the fusible element 250. The insulating layer 120 comprises a main portion 120*a* and a sub-portion 120*b*. The fusible element 250 is electrically connected to the resistive element 20 through a conductive member 260.

In the preferred embodiment illustrated in FIG. 15, the conductive member 260 extends through the first insulating layer 120 and the first electrode 100, and contacts the resistive element 20 at a point on the first surface 30 intermediate the main portion 120*a* and the sub-portion 120*b* of the insulating layer 120.

The main portion 120*a* of the insulating layer 120 contacts the resistive element 20 intermediate the first electrode 100 and the second end termination 156, acting as a barrier to direct current flow from the first electrode 100 to the second end termination 156. Likewise, the sub-portion 120*b* of the insulating layer 120 contacts the resistive element 20 intermediate the first end termination 155 and the first electrode 100, acting as a barrier to direct current flow from the first end termination 155 to the first electrode 100.

A second electrically insulating layer 121 is formed on the second electrode 110. The second insulating layer 121 makes contact with the resistive element 20 intermediate the second electrode 110 and the second end termination 156, acting as a barrier to direct current flow from the second electrode 110 to the second end termination 156.

As shown in FIG. 15, the fusible element 250 extends from the sub-portion 120*b* of the insulating layer 120 to the second end termination 156. A protective layer 270 covers the fusible element 250 to protect the fusible element from impact and oxidation.

The end terminations 155,156 of the device illustrated in FIG. 15 are also comprised of first and second conductive layers 150,180, respectively. The end terminations 155,156 preferably include the wrap-around configuration contacting the first and second surfaces 30,40 and the side walls 31,32 of the resistive element, respectively.

The preferred materials for use in the device 10 illustrated in FIG. 15 are the same as those previously discussed in connection with the embodiments illustrated in FIGS. 1–14.

Embodiment Illustrated in FIGS. 16A–16G

The device 10 comprising a fusible element 250 electrically connected in series with a resistive element 20 can be manufactured by a method similar to the methods discussed above.

Figure 16A:
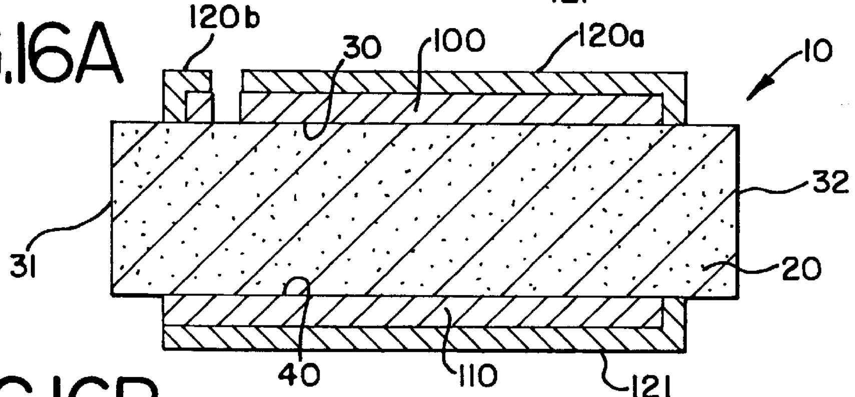
FIGS. 16A–16G illustrate the steps of a preferred method of manufacturing the device illustrated in FIG. 15 as applied to a cross-section of a single strip of the laminar PTC sheet in FIG. 4A.

In the first step illustrated in FIG. 16A, using the photolithographic, etching and dielectric applications discussed above, portions of the first and second electrodes 100,110 are removed to develop the gate (i.e., the aperture through the first electrode 100 and the first insulating layer 120 where the conductive member 260 will be formed) and the end terminations. In developing the gate, the main portion 120*a* and the sub-portion 120*b* of the insulating layer 120 are formed.

Figure 16B:
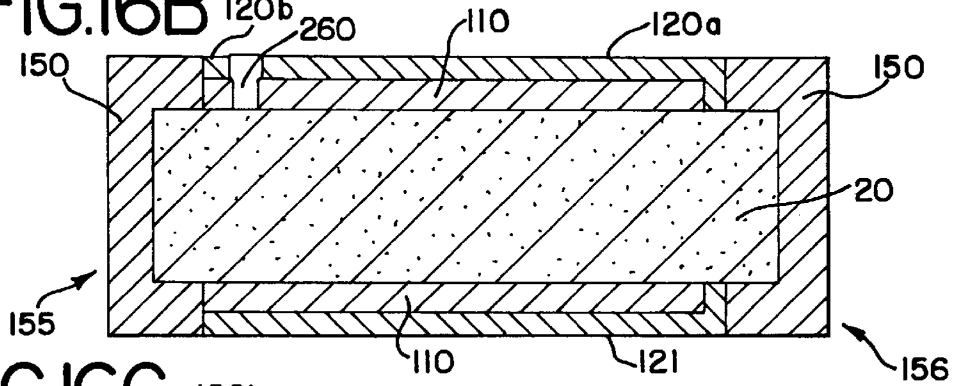

Referring to FIG. 16B, a conductive material is plated onto the exposed portions of the resistive element forming the conductive member 260 and the first conductive layer 150 of the end terminations 155,156, respectively.

Figure 16C:
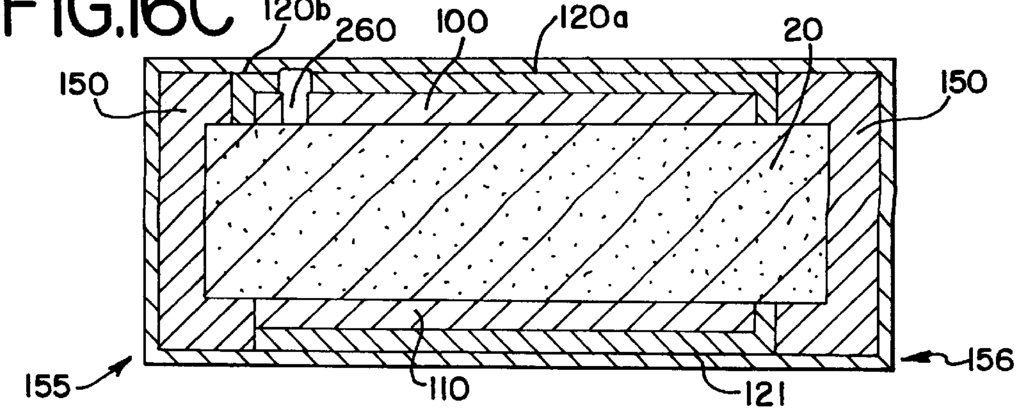
Figure 16D:
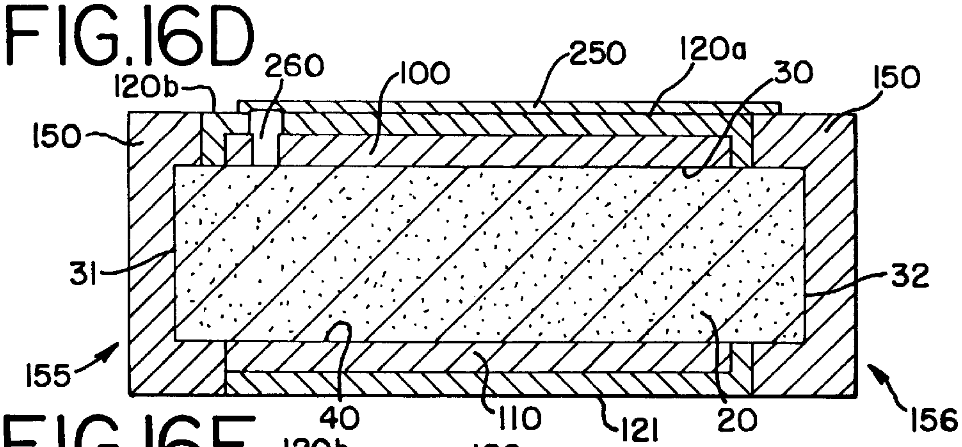

Next, the entire strip is electroless plated with copper (FIG. 16C). To form the fusible element 250, a photo resist material is applied to the strip, the fusible element 260 is imaged onto the resist material, and the material is cured and developed. The unprotected electroless copper layer is etched away and the cured photo resist is stripped, leaving behind the fusible element 260 (FIG. 16D).

Figure 16E:
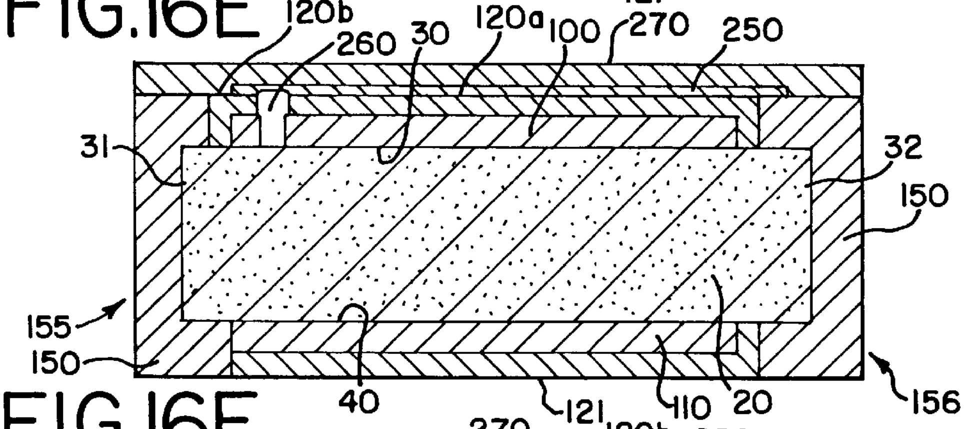
Figure 16F:
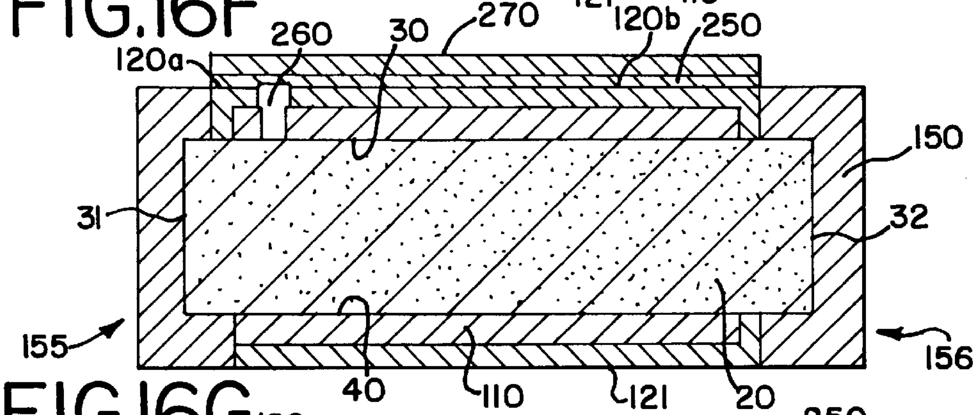
Figure 16G:
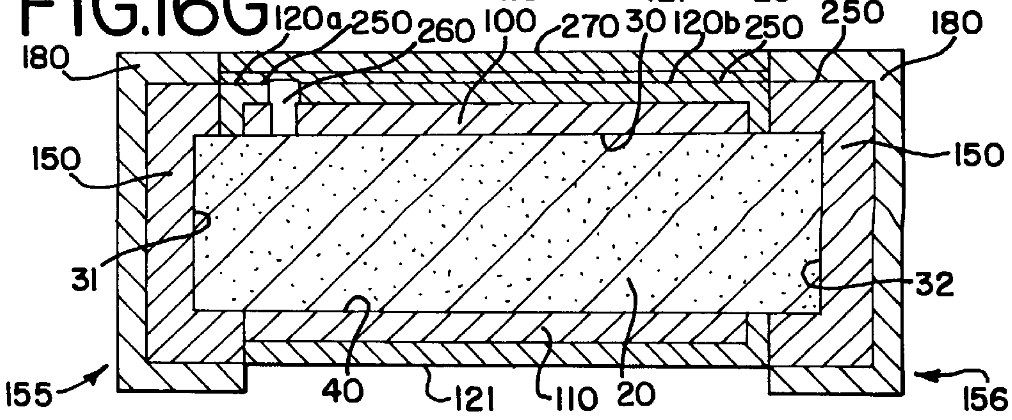

Referring to FIG. 16E, the protective layer 270 comprised of a dielectric material is applied to the fusible element 250 by coating the entire surface of the strip comprising the fusible element 250. Referring now to FIG. 16F, the protective layer 270 is imaged and developed to expose the first conductive layer 150 of the end terminations 155,156. In doing so, a small portion of the fusible element 250 in direct contact with the first conductive layer 150 of the second end termination 156 is also exposed.

Finally, a second conductive layer 180 is applied to the first conductive layer 150, completing the first and second end terminations 155,156. Each strip in the laminated sheet is then divided into a plurality of devices for protecting electrical circuits.

In the finished device 10 illustrated in FIG. 15 and made according to the method illustrated in FIGS. 16A–16G, electrical current flows from the circuit into first end termination 155 to the second electrode 110. Current then travels through the resistive element 20 to the first electrode 100 and through the conductive member 260 to the fusible element 250. From the fusible element 250, the current flows through the second end termination 156 and out to the circuit.

What is claimed is:

1. A device for protecting an electrical circuit comprising:

a resistive element having a first and a second surface connected to a first and a second side wall;

a first electrode disposed on the first surface of the resistive element and a second electrode disposed on the second surface of the resistive element;

a first end termination wrapping around the first side wall of the resistive element and electrically connecting the circuit and the second electrode;

a second end termination wrapping around the second side wall of the resistive element and electrically connecting the first electrode and the circuit; and an electrically insulating layer disposed on the first and second electrodes and interposed between the first end termination and the first electrode and interposed between the second end termination and the second electrode.

2. The device of claim 1, wherein the resistive element exhibits PTC behavior.

3. The device of claim 1, wherein the resistive element is comprised of a conductive polymer.

4. The device of claim 1, wherein the electrically insulating layer is in contact with the first and the second surfaces of the resistive element.

5. The device of claim 1, wherein first end termination is disposed on a portion of the first and second surfaces of the resistive element.

6. The device of claim 1, wherein the first end termination is in direct physical contact with the second electrode.

7. The device of claim 1, wherein the second end termination is in direct physical contact with the first electrode.

8. The device of claim 1, wherein the first end termination is disposed on the first side wall and the second end termination is disposed on the second side wall.

9. The device of claim 1, wherein the first and second end terminations are comprised of a first and a second conductive layer, respectively.

10. The device of claim 9, wherein the first conductive layer comprises a metal selected from the group consisting of tin, silver, copper, nickel, gold and alloys thereof.

11. The device of claim 9, wherein the second conductive layer comprises tin.

12. The device of claim 9, wherein the first conductive layer comprises copper and the second conductive layer comprises solder.

13. The device of claim 1, wherein the electrically insulating layer comprises a material selected from the group consisting of photo resist, dielectric, ceramic and solder mask.

14. The electrical device of claim 1, wherein the electrodes comprise a metallic foil.

15. A device for protecting an electrical circuit comprising:

a PTC element having a first and a second surface connected to a first and a second side wall;

a first electrode disposed on the first surface of the PTC element and a second electrode disposed on the second surface of the PTC element;

a first end termination wrapping around the first side wall of the PTC element and providing electrical connection between the circuit and the second electrode;

a first electrically insulating layer disposed on the first electrode;

a fusible element disposed on the first insulating layer, the fusible element electrically connected in series with the PTC element; and a second end termination wrapping around the second side wall of the PTC element and providing electrical connection between the fusible element and the circuit.

16. The device of claim 15, wherein the PTC element is comprised of a conductive polymer.

17. The device of claim 15 further including a conductive member electrically connecting the PTC element with the fusible element.

18. The device of claim 17, wherein the fusible element is in direct contact with the conductive member and the second end termination.

19. The device of Claim 15, wherein the first electrically insulating layer comprises a main portion and a sub-portion, and a conductive member electrically connects the resistive element and the fusible element through an opening in the first electrically insulating layer at a point intermediate the sub-portion and the main portion of the first electrically insulating layer.

20. The device of Claim 15 further including a second electrically insulating layer disposed on the second electrode.

21. The device of claim 20, wherein the second electrically insulating layer acts as a barrier to direct current flow from the second electrode to the second end termination.

22. The device of claim 20, wherein the second electrically insulating layer comprises a material selected from the group consisting of photo resist, dielectric, ceramic and solder mask.

23. The device of claim 15 further including a protective layer covering the fusible element.

24. The device of claim 15, wherein the first and second end terminations are comprised of a first and a second conductive layer, respectively.

25. The device of claim 24, wherein the first conductive layer comprises a metal selected from the group consisting of tin, silver, copper, nickel, gold and alloys thereof.

26. The device of claim 24, wherein the second conductive layer comprises tin.

27. The device of claim 26, wherein the first conductive layer comprises copper and the second conductive layer comprises solder.

28. The device of claim 15, wherein the first electrically insulating layer comprises a material selected from the group consisting of photo resist, dielectric, ceramic and solder mask.

29. A device for protecting an electrical circuit comprising:

a conductive polymer PTC element having a first and a second surface and a first and a second side wall;

a first electrode in electrical contact with the first surface of the PTC element and a second electrode the second surface of the PTC element;

a first end termination disposed on the first side wall of the PTC element and electrically connecting the circuit and the first electrode;

a second end termination disposed on the second side wall of the PTC element and electrically connecting the second electrode and the circuit; and an electrically insulating layer disposed on the first and second electrodes and creating a physical barrier between the second end termination and the first electrode and a physical barrier between the first end termination and the second electrode.

30. An electrical device for protecting a circuit comprising:

a conductive polymer PTC element having a first and a second surface and a first and a second side wall;

a first electrode in electrical contact with the first surface of the PTC element and a second electrode in electrical contact with the second surface of the PTC element;

a first end termination disposed on the first side wall of the PTC element and providing an electrical connection between the circuit and the first electrode;

a fusible element electrically connected in series with the PTC element; and a second end termination disposed on the second side wall of the PTC element and providing an electrical connection between the fusible element and the circuit.

* * * * *